US010447406B1

(12) United States Patent
Covington

(10) Patent No.: US 10,447,406 B1
(45) Date of Patent: Oct. 15, 2019

(54) MAGNETIC ANTENNA STRUCTURES HAVING SPATIALLY VARYING PROFILES

(71) Applicant: General Atomics, San Diego, CA (US)

(72) Inventor: Mark William Covington, San Diego, CA (US)

(73) Assignee: General Atomics, San Diego, CA (US)

( * ) Notice: Subject to any disclaimer, the term of this patent is extended or adjusted under 35 U.S.C. 154(b) by 818 days.

(21) Appl. No.: 15/161,141

(22) Filed: May 20, 2016

(51) Int. Cl.
*H04B 10/00* (2013.01)
*H04B 10/80* (2013.01)
*H01Q 1/48* (2006.01)
*H01Q 7/00* (2006.01)
*H04B 10/11* (2013.01)

(52) U.S. Cl.
CPC ............ *H04B 10/801* (2013.01); *H01Q 1/48* (2013.01); *H01Q 7/00* (2013.01); *H04B 10/11* (2013.01)

(58) Field of Classification Search
USPC .................................................. 398/115–117
See application file for complete search history.

(56) References Cited

U.S. PATENT DOCUMENTS

| | | | | |
|---|---|---|---|---|
| 5,523,749 A * | 6/1996 | Cole | ............ | B07C 3/18 340/10.34 |
| 10,250,301 B2 * | 4/2019 | Pagani | ............ | H01L 23/5387 |
| 2013/0193209 A1 * | 8/2013 | Tsirline | ............ | H01Q 1/2208 235/449 |
| 2013/0234902 A1 * | 9/2013 | Asanuma | ............ | H01Q 7/00 343/749 |
| 2013/0324041 A1 * | 12/2013 | Pagani | ............ | H01L 23/5387 455/41.1 |
| 2013/0342025 A1 * | 12/2013 | Cook | ............ | H02J 5/005 307/104 |
| 2014/0320369 A1 * | 10/2014 | Azenui | ............ | H01Q 1/526 343/841 |
| 2015/0077296 A1 * | 3/2015 | An | ............ | H01P 11/00 343/720 |
| 2015/0303573 A1 * | 10/2015 | Tomonari | ............ | H01Q 7/00 343/788 |
| 2015/0318609 A1 * | 11/2015 | Tomonari | ............ | H01Q 1/243 343/788 |
| 2016/0099498 A1 * | 4/2016 | Pance | ............ | H01F 1/0551 343/787 |
| 2016/0107028 A1 * | 4/2016 | Hartmann | ............ | H01Q 1/2216 324/207.22 |
| 2017/0063101 A1 * | 3/2017 | Sultenfuss | ............ | F28D 1/0472 |
| 2017/0115511 A1 * | 4/2017 | Beaton | ............ | G02C 7/04 |
| 2018/0107913 A1 * | 4/2018 | Shi | ............ | H04B 5/0031 |
| 2018/0159235 A1 * | 6/2018 | Wolniansky | ............ | H01Q 11/083 |
| 2018/0198310 A1 * | 7/2018 | Hwang | ............ | H05K 9/00 |
| 2018/0241438 A1 * | 8/2018 | Ahn | ............ | H04B 5/0087 |

* cited by examiner

*Primary Examiner* — Agustin Bello
(74) *Attorney, Agent, or Firm* — Perkins Coie LLP

(57) ABSTRACT

Magnetic antenna techniques and devices are disclosed for operating at an RF or microwave frequency by using a magnetic antenna structure having a spatially varying property that varies spatially from one location to another location in at least a portion of the magnetic antenna structure. Such a spatially varying property can be reflected in various ways, e.g., a spatially varying geometry profile in part of or the entirety of the magnetic antenna structure, a spatially varying antenna material property in a spatially uniform geometry or a spatially varying geometry. The disclosed technology also provides magnetic antenna structures based on splitting the componentry for transmission and reception so that each can be individually optimized.

71 Claims, 20 Drawing Sheets

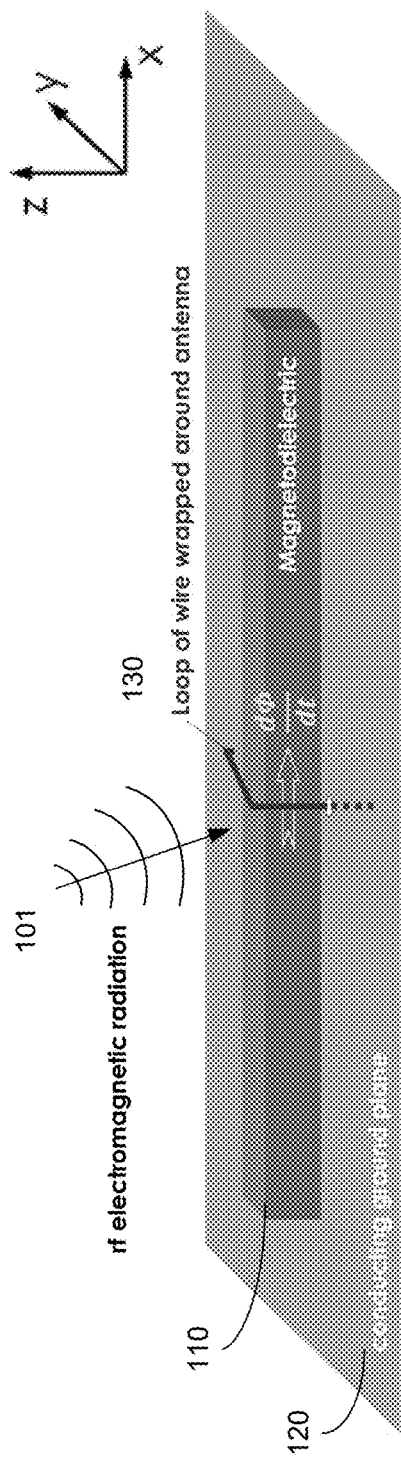
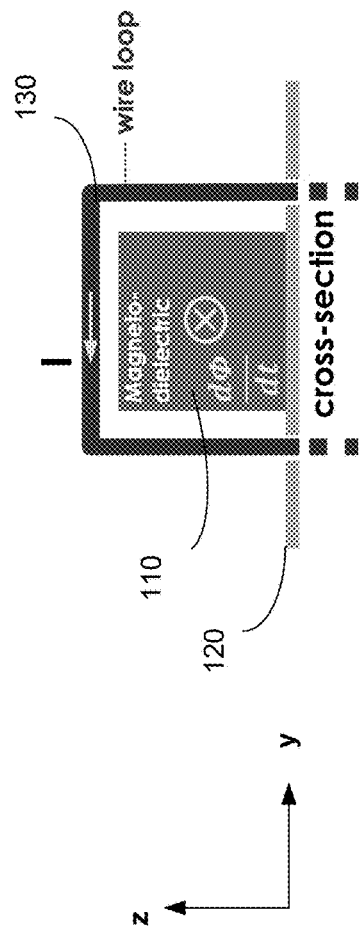
FIG. 2A
FIG. 2B

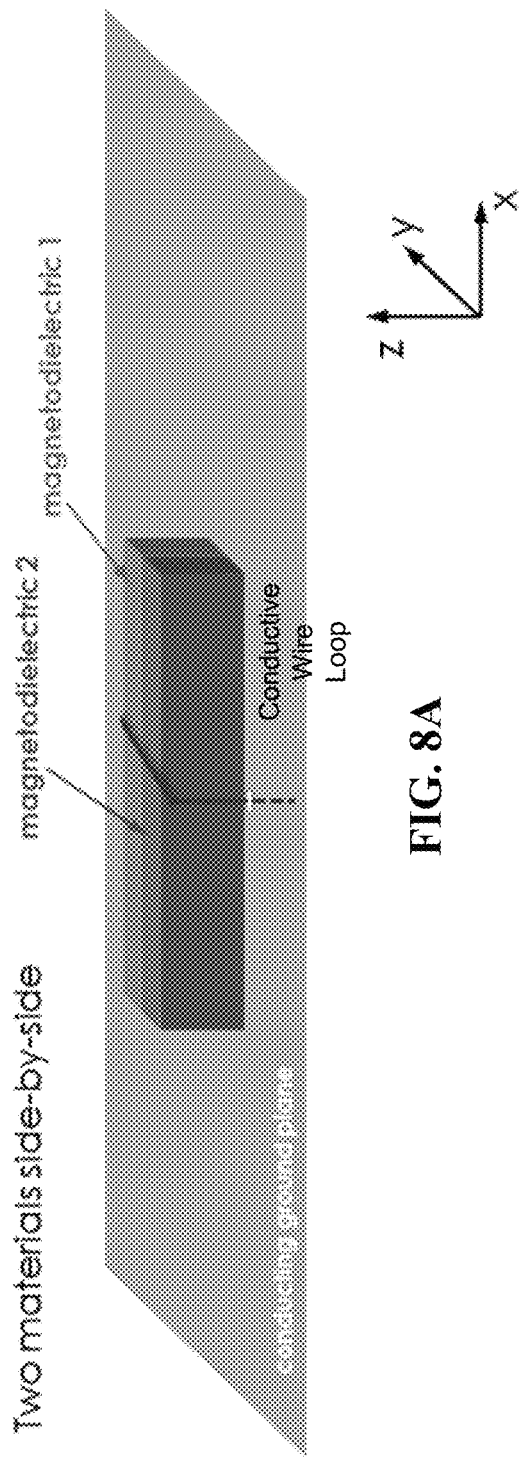
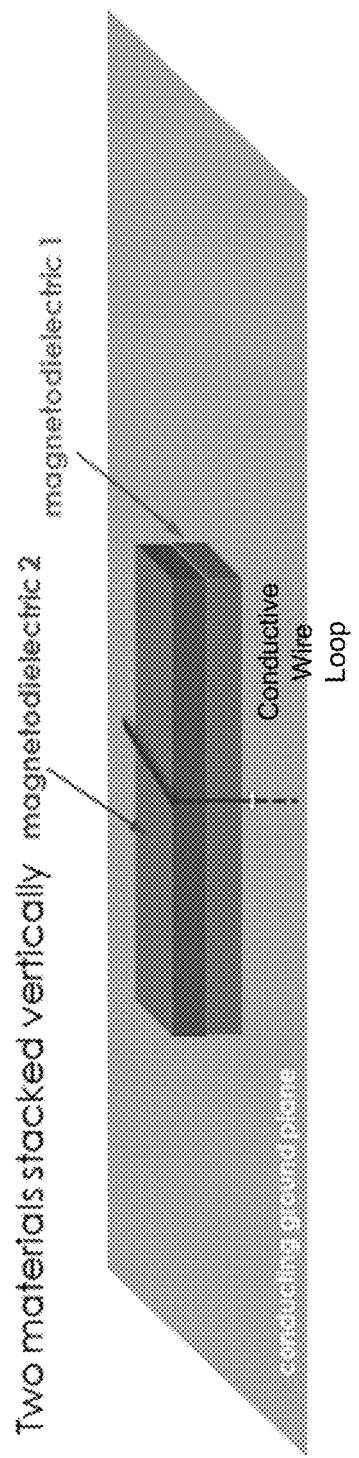
FIG. 8A
FIG. 8B

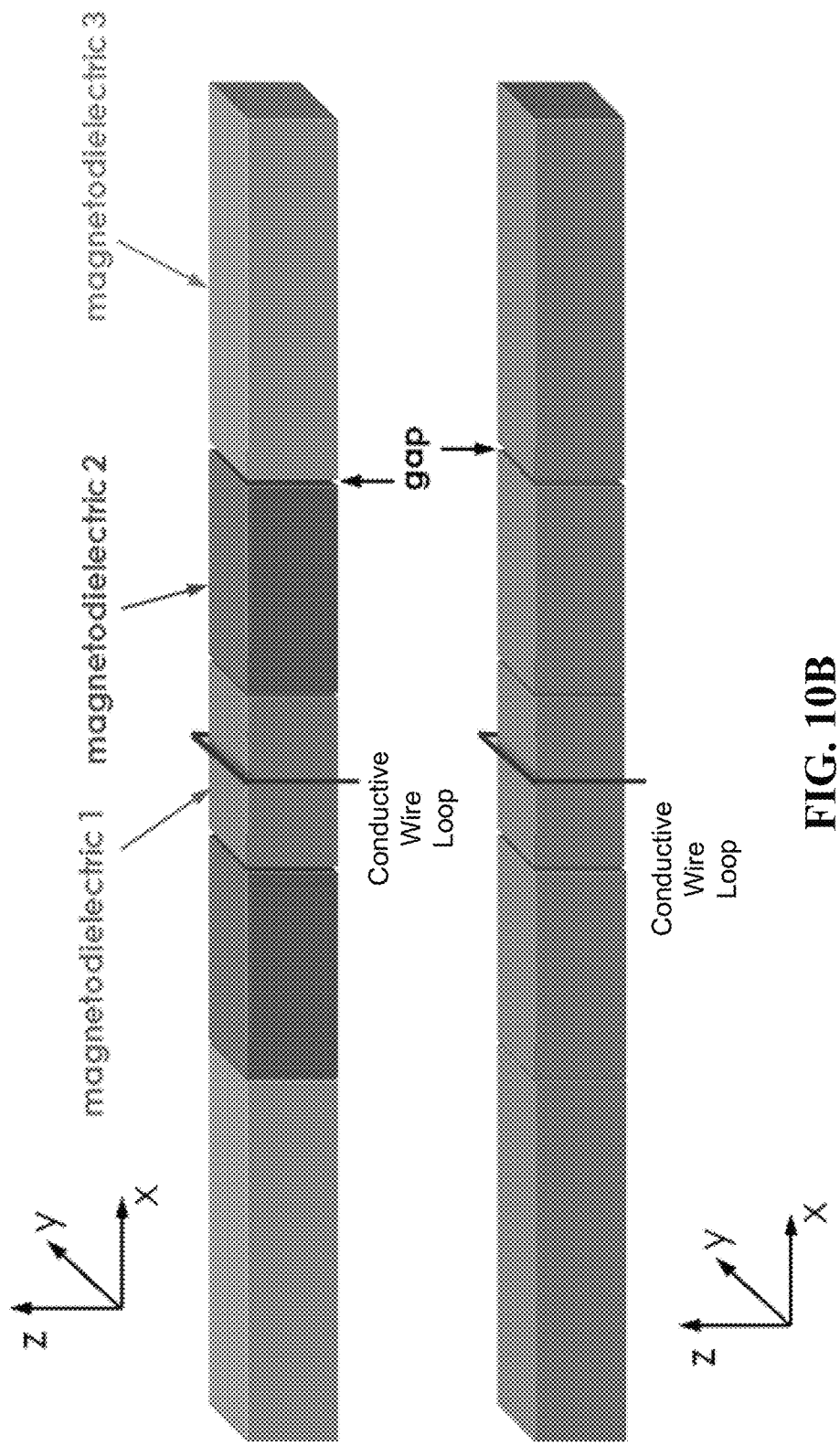

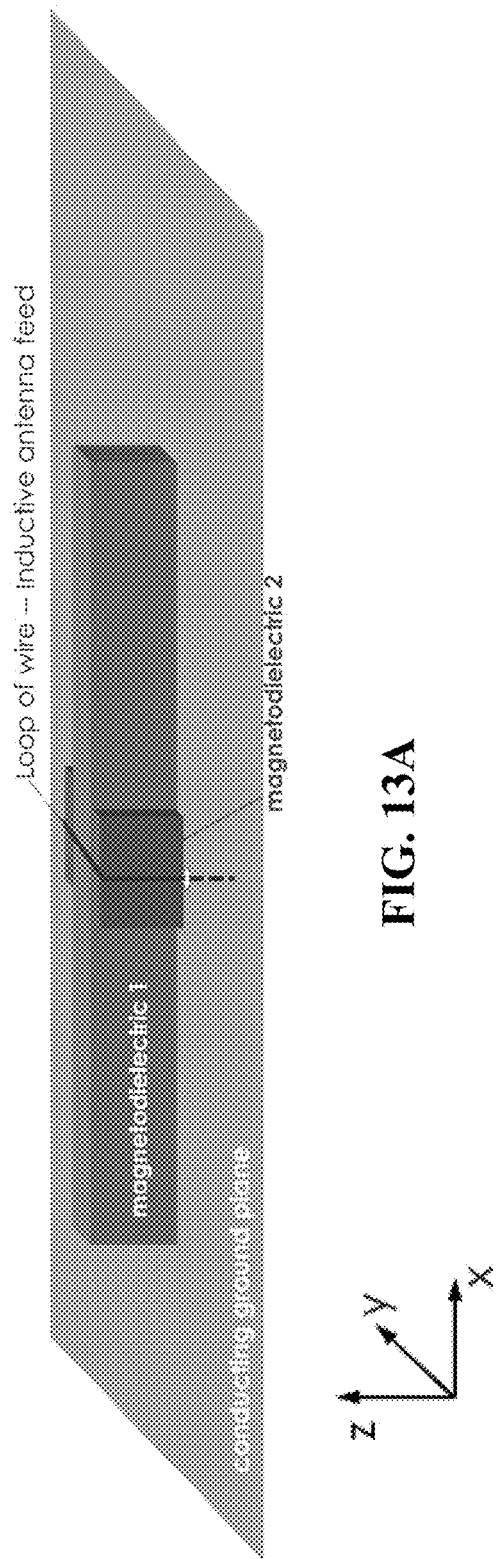
FIG. 13A
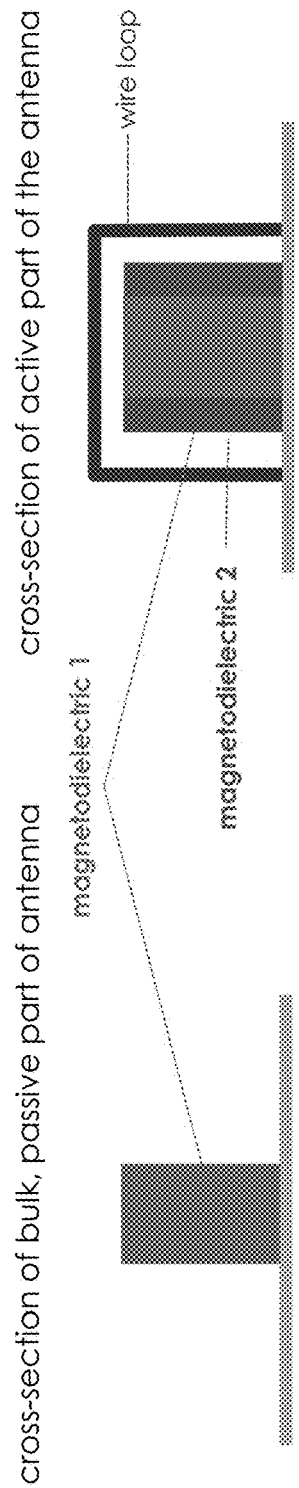
FIG. 13B
FIG. 13C

MAGNETIC ANTENNA STRUCTURES HAVING SPATIALLY VARYING PROFILES

TECHNICAL FIELD

This patent document relates generally to antennas for transmitting or receiving electromagnetic energy or signals in various applications including wireless communications.

BACKGROUND

An antenna used in many radar systems, radio or communication devices is typically an electrically conductive device made of one or more electrically conductive materials and interfaces with a circuit and a medium surrounding the antenna, such as air or other dielectric medium, to either transmit an electromagnetic wave from the circuit into the medium or to receive an electromagnetic wave from the medium into the circuit. In transmitting the electromagnetic wave from the circuit into the medium, the circuit operates to generate an alternating current distribution at one or more alternating radio frequencies in the antenna which in turn radiates an electromagnetic wave at the one or more radio frequencies into the medium. In receiving an electromagnetic wave from the medium into the circuit, the antenna interfaces with the incoming electromagnetic wave at one or more radio frequencies to produce an alternating current distribution at one or more alternating radio frequencies in the antenna which are received by the circuit. In both transmitting and receiving operations, the conventional antenna transduces power between the free space electromagnetic wave and a guided wave on a transmission line connected to the antenna.

SUMMARY

Examples of antenna techniques and devices are disclosed for operating at an RF or microwave frequency by using a magnetic antenna structure that is configured to have a spatially varying property that varies spatially from one location to another location in at least a portion of the magnetic antenna structure. Such a spatial varying property can be reflected in various ways, e.g., a spatially varying geometry profile in part of or the entirety of the magnetic antenna structure, a spatially varying antenna material property in a spatially uniform geometry or a spatially varying geometry. Such spatially varying magnetic antenna structures may be used to achieve certain advantages in specific antenna applications, including, e.g., enhancing an efficiency in transmitting or receiving a radio frequency or microwave signal, reducing the overall size or volume and weight of a magnetic antenna structure in meeting certain operational bandwidths, or reducing the overall cost by mixing different magnetic antenna materials in constructing a particular magnetic antenna structure.

In one aspect, the disclosed technology can be used to provide a magnetic antenna device that includes a magnetic antenna structure that is ferromagnetic and interacts with a radio frequency or microwave signal to receive and concentrate a magnetic field of the radio frequency or microwave signal locally in or near the magnetic antenna structure. The magnetic antenna structure is configured to have a spatial varying property that varies spatially from one location to another location in at least a portion of the magnetic antenna structure. This device includes an antenna circuit communicatively coupled to the magnetic antenna structure to receive an antenna signal from the magnetic antenna structure associated with the received and concentrated magnetic field of the radio frequency or microwave signal locally in or near the magnetic antenna structure and to supply an output antenna signal to the magnetic antenna structure for transmission.

In another aspect, the disclosed technology can be used to provide a method for operating a magnetic antenna device. This method includes providing a magnetic antenna structure in the magnetic antenna device, that is ferromagnetic and has a spatially varying property that varies spatially from one location to another location in at least a portion of the magnetic antenna structure, to gain an advantage from the spatially varying property of the magnetic antenna structure in operating the magnetic antenna device; operating the magnetic antenna device to radiate or receive a radio frequency or microwave signal via the magnetic antenna structure; and, in receiving a radio frequency or microwave signal, operating the magnetic antenna structure to concentrate a magnetic field of the received radio frequency or microwave signal locally in or near the magnetic antenna structure, and using the locally concentrated magnetic field to extract information from the received radio frequency or microwave signal.

The disclosed technology also provides magnetic antenna structures based on splitting the componentry for transmission and reception so that each can be individually optimized. For example, a magnetic antenna device can be provided to include a magnetic antenna structure that is ferromagnetic and interacts with a radio frequency or microwave signal to receive and concentrate a magnetic field of the radio frequency or microwave signal locally in or near the magnetic antenna structure; and an antenna circuit including (1) an antenna reception circuit coupled to the magnetic antenna structure to interact with the received and concentrated magnetic field of the radio frequency or microwave signal locally in or near the magnetic antenna structure, and (2) an antenna transmission circuit separated from the antenna reception circuit and also coupled to the magnetic antenna structure to supply an output antenna signal to the magnetic antenna structure for transmission.

The above and other aspects, and associated implementations are described in greater detail in the description, the drawings and the claims.

BRIEF DESCRIPTION OF THE DRAWINGS

FIGS. 2A and 2B show an example of a conformal configuration of a magnetic antenna device over an electrically conducting ground plane that can be used for implementing the device design in FIG. 1.

FIGS. 8A and 8B show two examples of using different magnetic materials to form spatial varying property profiles in magnetic antenna structures.

FIGS. 10A-10D show examples of using different magnetic segments to form a spatial varying property in a magnetic antenna structure along the elongated direction of the antenna in FIG. 1.

FIGS. 13A-13C show examples of designing a spatial varying property profile in a magnetic antenna structure to enhance the antenna transmission efficiency.

DETAILED DESCRIPTION

Figure 1:
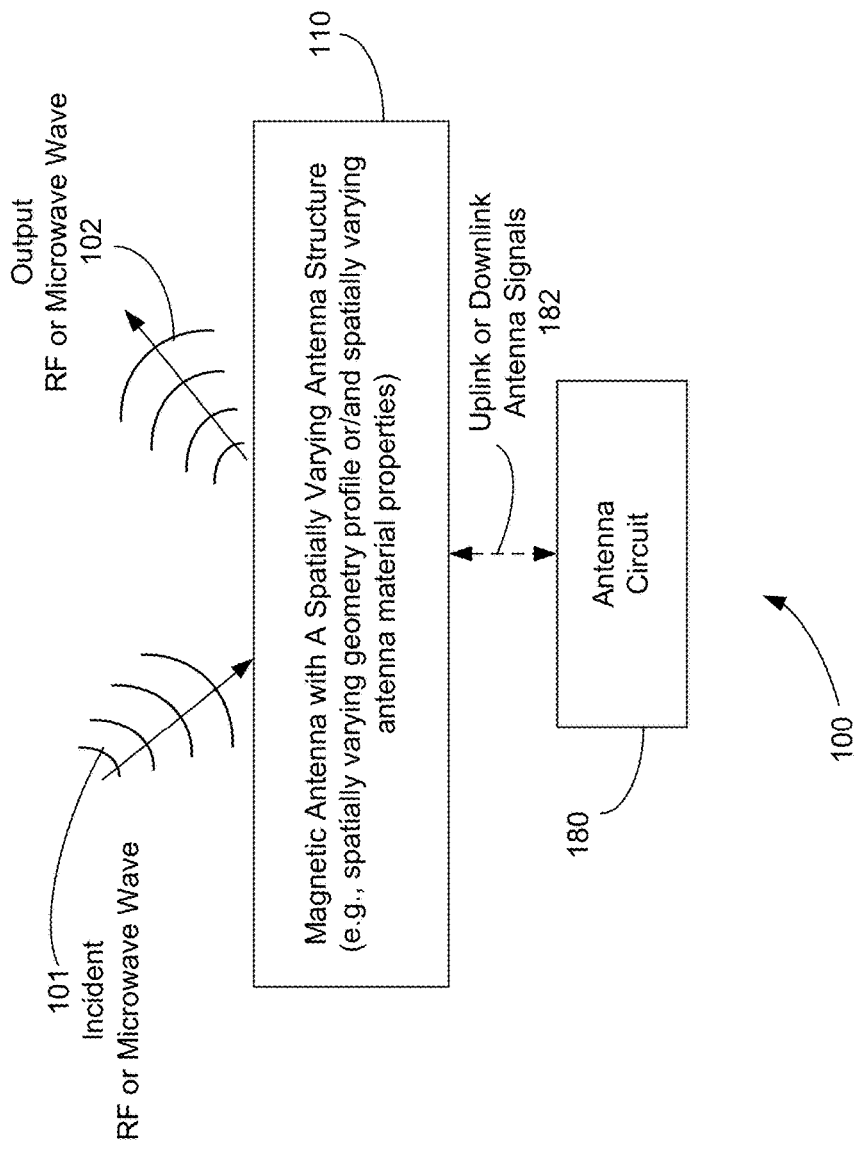
FIG. 1 shows an example of a magnetic antenna device that implements the disclosed technology using a spatial varying property in the magnetic antenna structure.

Antenna devices based on conventional electrically conductive materials such as metals tend to have a uniform material property along the conductive part or parts of an antenna, e.g., the same metal being used to form all the antenna parts of the antenna. In operation, an antenna device based on conventional electrically conductive materials such as metals also relies on the conductive part or parts of the antenna to capture the varying current or voltage in receiving an incoming antenna signal. The geometry and/or dimension of electrically conductive materials such as metals must be configured to satisfy a desired impedance matching condition at one or more operating frequencies of the antenna device. Due to those and other features of antennas based on conventional electrically conductive materials such as metals, the spatial structure including the spatial pattern and size and any material properties tends to be fixed in certain ways and leave little room for deviations.

Magnetic antenna designs disclosed in this patent document explore certain unique features in those magnetic antennas to use some spatially varying properties from one location to another location in at least a portion of the magnetic antenna structure to gain certain device design, fabrication or operational advantages. For example, a magnetic antenna disclosed in this document, in the antenna receiving operation, first localizes a magnetic field in an incoming antenna signal to concentrate the magnetic flux at one or more locations and then converts a concentrated magnetic field at a location into an RF or microwave signal for the receiver operation. This aspect is different from an antenna based on conventional electrically conductive materials such as metals and allows more flexibility in the spatial distribution of the magnetic antenna geometry or spatial distribution of the material property of the magnetic antenna. In the disclosed magnetic antenna designs in this document, a spatial varying property can be reflected in various ways, e.g., a spatially varying geometry profile in part of or the entirety of the magnetic antenna structure, a spatially varying antenna material property in a spatially uniform geometry or a spatially varying geometry. The disclosed magnetic antenna designs using a spatially varying antenna property provide various spatially varying design parameters to achieve one or more advantages or benefits that are additional to or associated with certain advantages that can be achieved in magnetic antennas, including high antenna efficiency, wideband operations, compact sizing, conformal configurations over support bases, lightweight, and others. For example, spatially varying magnetic antenna structures may be used to achieve one or more advantages in specific antenna applications, including enhancing an efficiency in transmitting or receiving a radio frequency or microwave signal, reducing the overall size or volume and weight of a magnetic antenna structure in meeting certain operational bandwidths, or reducing the overall cost by mixing different magnetic antenna materials in constructing a particular magnetic antenna structure.

A suitable spatially varying magnetic antenna structure based on the disclosed technology can be designed to manage the flow of the magnetic flux density, B, through the magnetic material during operation, and, in some cases, may be used to optimize one or more aspects of a magnetic antenna device for a particular need or performance feature in an application.

FIG. 1 shows an example of a magnetic antenna device that implements the disclosed technology using a spatial varying property in the magnetic antenna structure. In this example, the magnetic antenna device 100 includes a magnetic antenna structure 110 and an antenna circuit 180 that is coupled to and operates the magnetic antenna structure 110. The magnetic antenna structure 110 is ferromagnetic and has a ferromagnetic magnetization that can be modified or influenced by a magnetic field applied to or incident to the magnetic antenna structure 110. For example, the magnetic antenna structure 110 can interact with an incident radio frequency or microwave signal 101 to receive and concentrate a magnetic field of the radio frequency or microwave signal 101 locally in or near the magnetic antenna structure 110. Notably, the magnetic antenna structure 110 is configured to have a spatial varying property that varies spatially from one location to another location in at least a portion of the magnetic antenna structure 110. The antenna circuit 180 is communicatively coupled to the magnetic antenna structure 110 to receive an antenna signal 182 (a downlink signal) from the magnetic antenna structure 110 associated with the received and concentrated magnetic field of the radio frequency or microwave signal 101 locally in or near the magnetic antenna structure and to supply an output antenna signal 182 (an uplink signal) to the magnetic antenna structure for transmission as the output RF or microwave signal 102.

The magnetic material for this antenna 110 can be implemented in various forms, e.g. by using a composite magnetic material structure with different parts or/and materials that are engineered to achieve certain desired material properties based on the requirements of particular antenna applications. The magnetic material for this antenna 110 can include magnetodielectric materials.

In some implementations, the magnetic antenna 110 in FIG. 1 can be structured to exhibit a relatively high magnetic permeability $\mu$. The magnetic permeability $\mu$ includes two parts: the imaginary permeability $\mu''$ and the real permeability $\mu'$. A material with a small imaginary permeability $\mu''$ tends to improve the antenna efficiency. A suitable ferromagnetic material structure for the antenna 110 may be configured to have different properties of its magnetic permeability $\mu$. For example, in some applications, the real permeability ($\mu'$) may be less than the imaginary permeability ($\mu''$). In other applications, possibly in many applications, the real permeability ($\mu'$) may be greater than the imaginary permeability ($\mu''$). Under this regime for $\mu'>\mu''$, the composite antenna structure 110 may also have its real permittivity ($\varepsilon'$) greater than its imaginary permittivity ($\varepsilon''$). In some applications, the real part of the electromagnetic constitutive property can be significantly greater than a corresponding imaginary part of the electromagnetic constitutive property. For example, the real part of the electromagnetic constitutive properties may be three, five, tens or even hundreds of times greater than the corresponding imaginary electromagnetic constitutive property. The higher real part of electromagnetic constitutive property may be used advantageously to reduce the cross section dimension of the structure. For material compositions for the structure to have the real part of the electromagnetic constitutive property to be greater than a corresponding imaginary part of the electromagnetic constitutive property (e.g., real permittivity ($\varepsilon'$)>imaginary permittivity ($\varepsilon''$); or real permeability ($\mu'$)>imaginary permeability ($\mu''$)), such a material may be referred to as a pseudo-conductor material as described in U.S. Pat. Nos. 8,773,312 B1; 8,847,840 B1; 8,847,846 B1 and 8,686,918 B1 that are granted to Rodolfo E. Diaz and are assigned to General Atomics. The above-referenced four U.S. patents are incorporated by reference as part of this patent document.

In other implementations, the magnetic antenna 110 in FIG. 1 may be engineered to achieve a high bandwidth operation by increasing the ratio of the permeability to the permittivity. In this regard, various permeable materials, such as many commercially available magnetic materials, tend to be heavy, fragile ceramic ferrites with limited frequency capabilities. For example, Manganese ferrites ($\mu'$ in the 1000's) can be utilized for some implementations in the KHz to low MHz range, Nickel Zinc ferrites ($\mu'$ in the 100's) may provide permeabilities in the VHF range; while approaching 1 GHz, hexaferrites (e.g. $Co_2Z$) have sizeable permeabilities in the 10 to 30 range, but often become less efficient from the high UHF and up. Since many ferrite ceramics have a permittivity of the order of 10, this means that as the GHz range is approached the highest $\mu/\varepsilon$ ratio attained by a ferrite is of the order of 3:1 ($\varepsilon\sim3$) by aligned $Co_2Z$. As such, many of these materials, such as natural ferrites, suffer from naturally limited efficiency bandwidths usually associated with broad loss peaks that introduce excess unwanted loss. Materials can be engineered to have $\mu'>>\varepsilon'$ to provide wider efficiency bandwidth operations. For example, such a device can be configured to detect signals from DC to L-band and do so without requiring a special tuning circuit (for example) to efficiently receive in the frequency band of interest. In implementing the disclosed antenna devices, a single magneto-optical magnetic antenna can cover a frequency range that would require multiple electrical antennas.

In connection with the magnetic antenna 110 in FIG. 1, FIGS. 2A and 2B show an example of a magnetic antenna in a conformal configuration over an electrically conducting surface such as a metal plate or base. In the xyz coordinates shown, the conducting ground plane 120 lies in the xy-plane and the antenna 110 is elongated along the x direction. This configuration can be used for implementing the device design in FIG. 1. In the illustrated magnetic antenna in FIGS. 2A and 2B, the ferromagnetic material structure (e.g., a magnetodielectric material) for the antenna 110 is used as the entire or part of the composite antenna structure for the antenna 110 and is placed over an electrically conducting plane 120 such as a surface of a metal structure and a metal conductor loop 130 is provided to surround a portion of the ferromagnetic material structure for the antenna 110.

Figure 3:
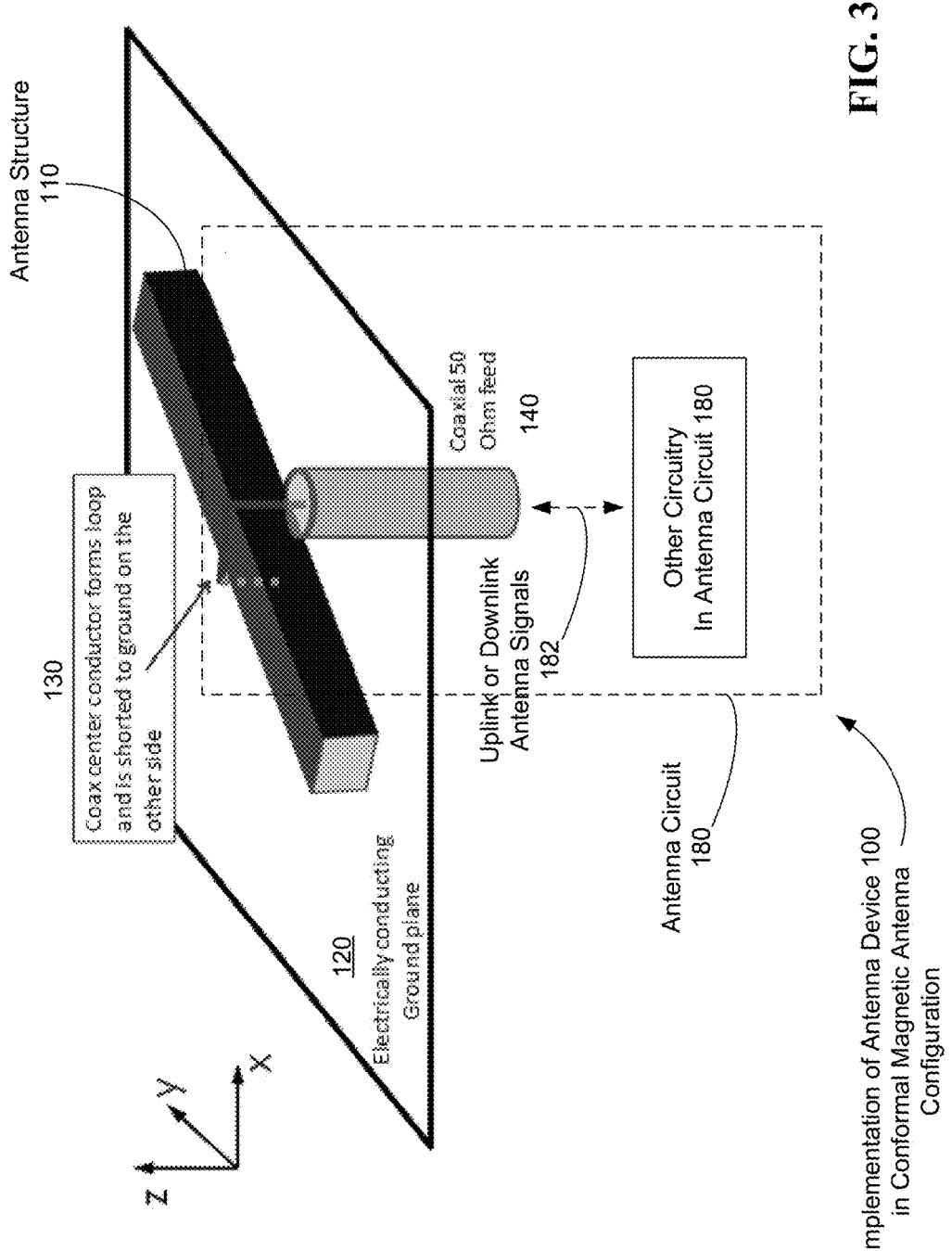
FIG. 3 further shows an example for using a coaxial feed line as part of the antenna circuit when implementing the device design in FIG. 1.

FIG. 3 further shows an example in which a coaxial feed line 140 is provided for sending an antenna signal in form of a current into the loop 130 or for receiving the generated current by the loop 130 as part of the antenna circuit 180 when implementing the device design in FIG. 1. The magnetic antenna 110 can convert an oscillating current in the metal conductor loop 130 from an antenna transmission circuity via the coaxial feed line 140 into an oscillating magnetic field in the ferromagnetic material of the antenna 110 that would radiate as an output RF or microwave signal. In addition, this structure allows the ferromagnetic material of the antenna 110 to capture and concentrate the magnetic field of the incident electromagnetic signal and converts the captured and concentrated magnetic field into a current in the loop 130 in a receiver operation. Notably, in FIGS. 2A, 2B and 3, the ferromagnetic material structure for the antenna 110 has a conformal configuration with respect to the conducting plane 120 and such a conformal configuration is beneficial or desirable in various applications. This conformal antenna configuration on a conducting structure is difficult to implement with other antennas using electrically conductive materials such as metals. In implementations, the ferromagnetic material structure for the antenna 110 (including its conformal configuration) may be used in various disclosed antenna devices to concentrate the magnetic flux of the received signal.

Figure 4:
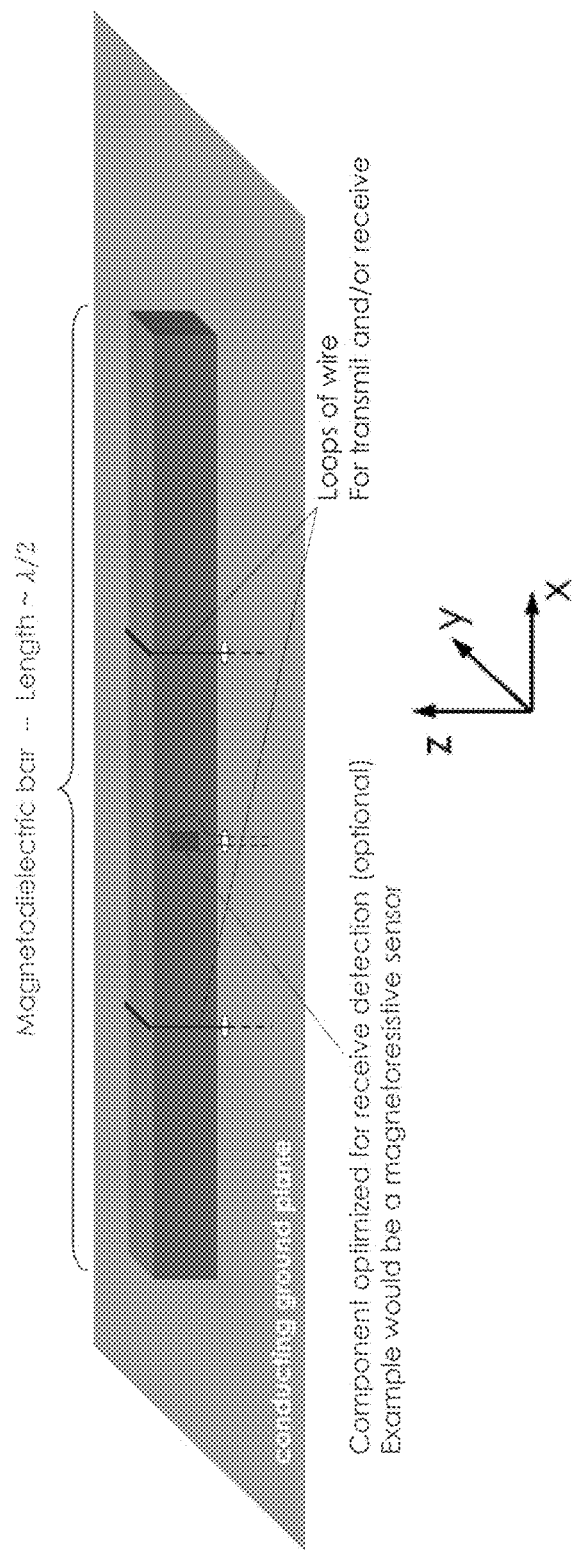
FIG. 4 shows an example of a magnetic antenna device with both antenna transmission and reception circuits.

FIG. 4 shows an example of a bar-shaped magnetic antenna that uses the conformal configurations as in FIGS. 2A, 2B and 3. The magnetodielectric structure is fashioned into a bar shape that efficiently couples to the electromagnetic modes of interest and may, for example, be a length of about one half of the electromagnetic wavelength of an RF or microwave signal. This particular example uses two or more conductive wire loops at different positions along the bar-shaped magnetic antenna to wrap around the bar that typically have a shared use for both transmitting and receiving signals. In some implementations, the transmit and receive componentry can be decoupled so that each can be individually optimized for its specific role, for example, one loop configured and optimized for transmitting an outgoing RF or microwave signal and another loop configured and optimized for receiving an incoming RF or microwave signal.

As shown in FIG. 4, the two conductive wire loops can be used as designated receiver detectors while the antenna receive detector is a completely separate, designated detector that includes magnetoresistive (MR) sensor. The MR sensor can be located inside or near the bar-shaped magnetic antenna to either magnetically couple to the magnetization of the bar-shaped magnetic antenna (e.g., via magnetic exchange coupling) or reside in the magnetic field of the received RF or microwave signal so that the MR sensor can sense a magnetic field of the electromagnetic field caused by the received radio frequency or microwave signal based on the MR effect and an associated variable resistance of the MR sensor. This MR sensing produces an MR sensor signal that carries information in the received radio frequency or microwave signal.

The spatial geometry, size, and/or the material property of the magnetic antenna can be designed to vary spatially at different locations in one or more selected sections of, or the entirety of, the magnetic antenna to improve the antenna performance. Examples of such magnetic antenna designs are provided below to encompass magnetodielectric structures with variable cross-sectional areas and a non-uniform set of materials.

Figure 5:
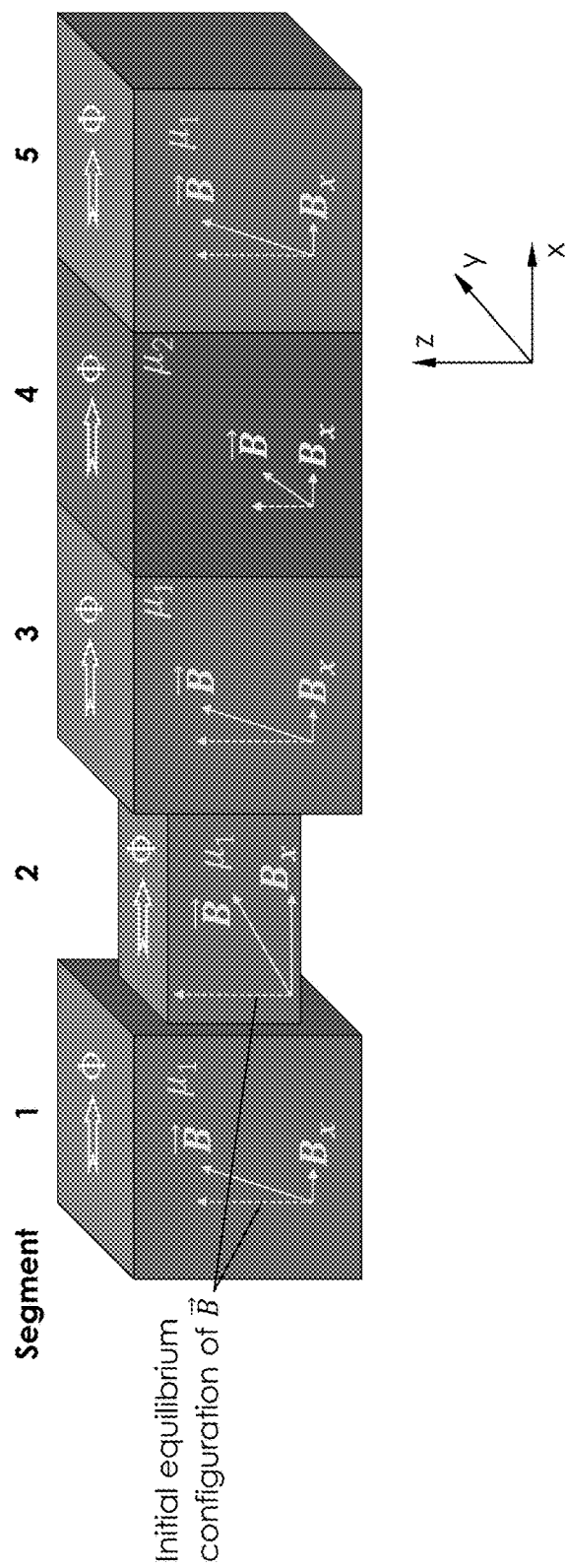
FIG. 5 shows an example of a magnetic antenna structure with different segments at different locations.

FIG. 5 shows an example of a magnetic antenna structure with different segments at different locations. In this example, the magnetic flux, Φ, is driven through the magnetic antenna structure along the x-axis. The magnetic antenna structure includes permeable ferromagnetic material segments. The equilibrium magnetic flux density, $\vec{B}$, aligns along the z-axis. The magnetic flux flows along the x-axis occurs when $\vec{B}$ rotates and there is a component, $B_x$, along the x-direction. The magnetic antenna structure can be designed to preserve the flux from segment to segment by reducing or minimizing leaking of the magnetic flux.

In this illustrated example, segments 1, 3, and 5 are identical and therefore have the same rotation of $\vec{B}$ (same x-component, $B_x$). Segment 2 is made of the same material μ1 as segments 1 and 3 but it has a smaller cross-sectional area, A. Since the flux ($\Phi=B_xA$) is conserved, the rotation of $\vec{B}$ and the x-component, $B_x$, are larger in Segment 2. Segment 4 has the same cross-sectional area as segments 3 and 5 but it is made of a different material μ2.

The structure in FIG. 5 can be implemented in different variations. For example, one variation is that segment 4 is a ferromagnet with the same permeability, μ1, but a smaller saturation magnetization, $M_s$ (as shown in the schematic). The induced x-component, $B_x$, is the same as in segments 3 and 5. However, since the length of $\vec{B}$ is smaller in segment 4, the rotation of $\vec{B}$ away from its equilibrium direction is larger. Another variation is that segment 4 has the same $M_s$ value but higher permeability, μ2. This also leads to a larger induced x-component, $B_x$.

Figure 6:
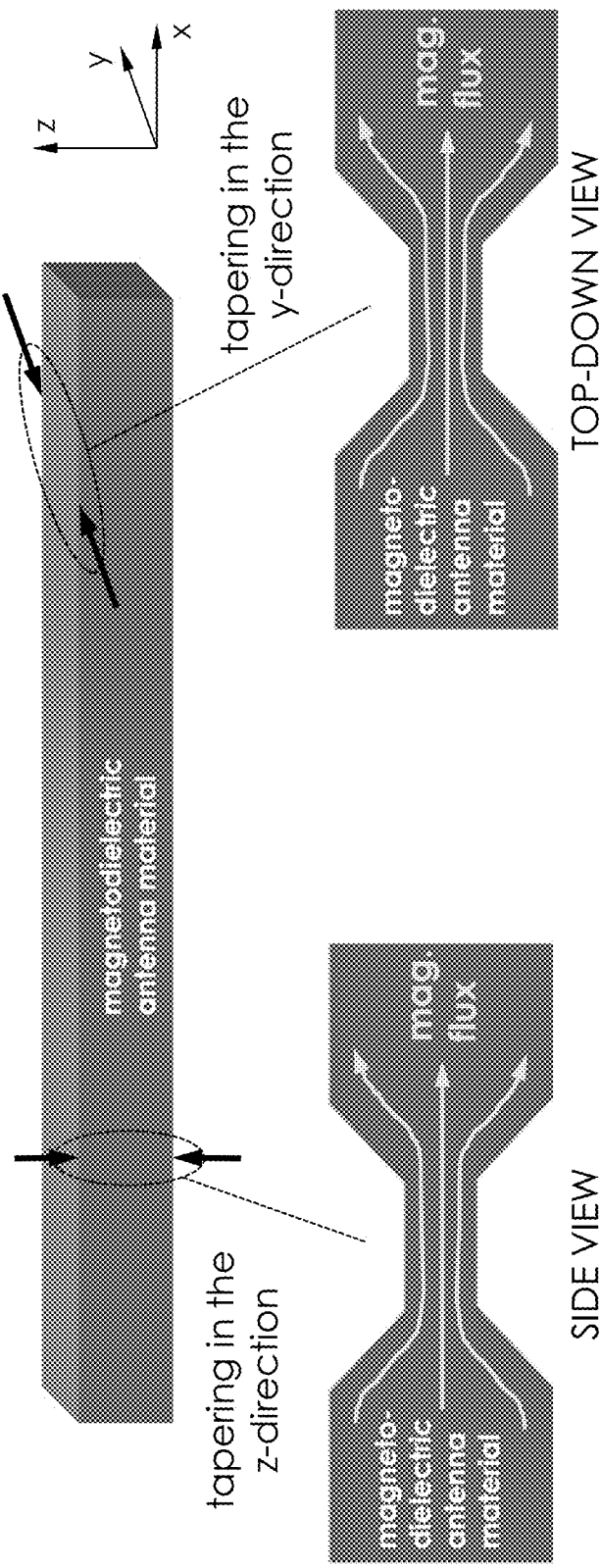
FIG. 6 shows another example of a spatial varying property in the magnetic antenna structure.

FIG. 6 shows another example of a spatial varying property in the magnetic antenna structure. The cross-sectional area of the magnetodielectric antenna material can be varied in either of one of two dimensions or a combination of both. The tapered or narrowed section allows the magnetic antenna structure to locally concentrate the magnetic flux density in a small tapered region. This can be beneficial for certain receive detection methods, such as sensing based on magnetoresistive (MR), magneto-optic (MO) or electro-optical (EO) effect.

Figure 7:
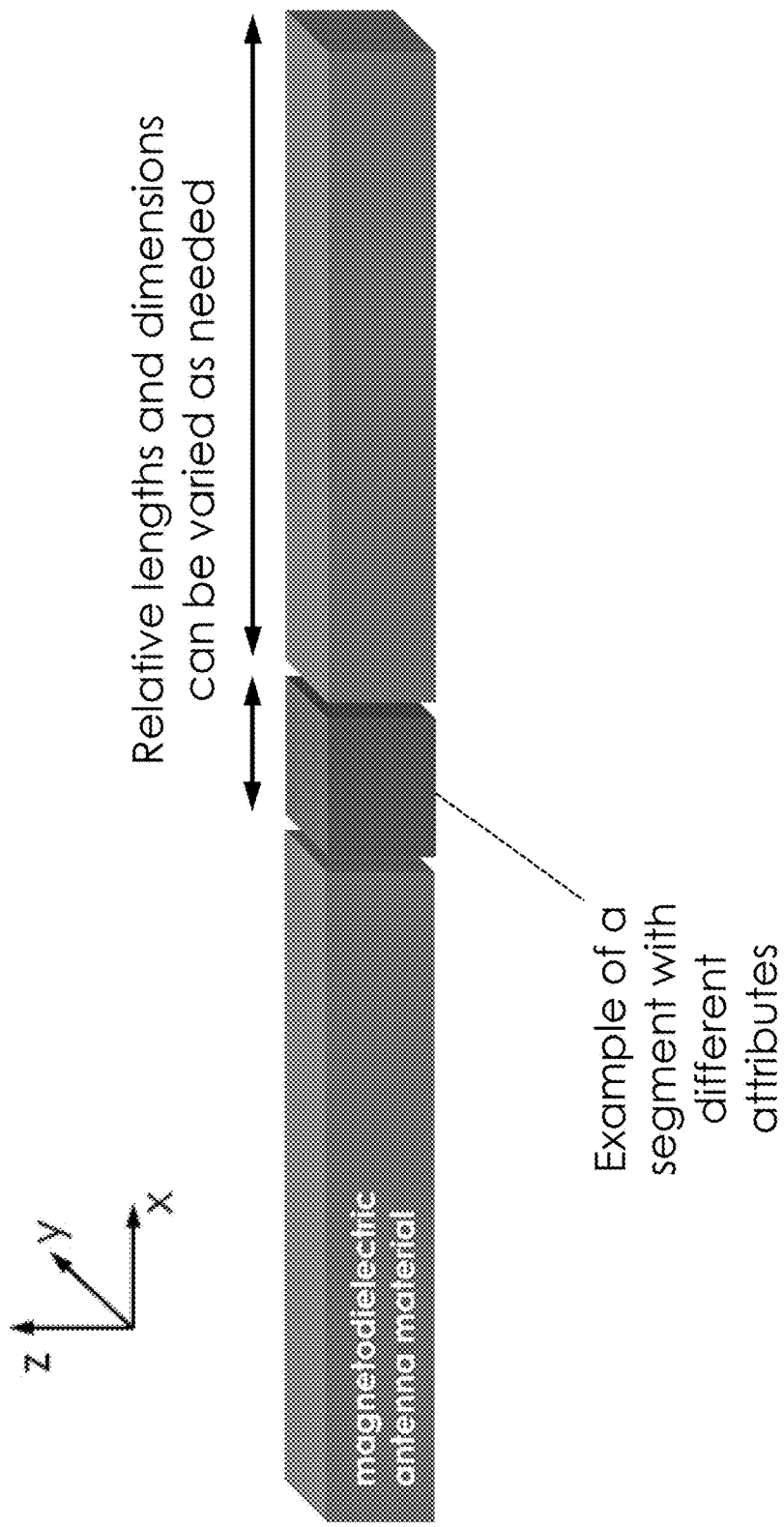
FIG. 7 shows an example of a spatial varying property in the magnetic antenna structure that provides a spatially varying saturation magnetization ($M_s$).

FIG. 7 shows an example of a spatial varying property in the magnetic antenna structure that provides a spatially varying saturation magnetization ($M_s$). In implementations, the entire magnetic antenna structure can be a composite structure having different segments based on different ferromagnetic materials. In the illustrated example, the middle segment may be selected to have a higher saturation magnetization. Also, the lengths or cross section areas of different segments can be varied and selected to meet specific needs of the applications.

Figure 9:
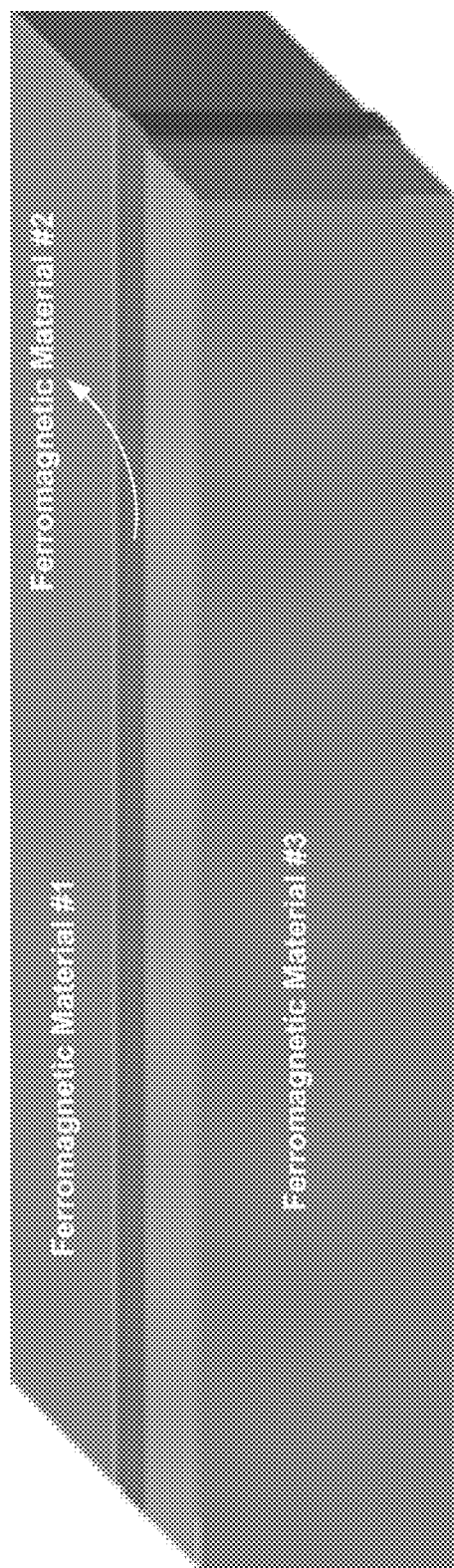
FIG. 9 shows an example of using three different ferromagnetic materials to form a spatial varying property in a magnetic antenna structure.

FIGS. 8A and 8B show two examples of using different magnetic materials to form spatial varying property profiles in magnetic antenna structures. FIG. 9 shows an example of using three different ferromagnetic materials to form a spatial varying property in a magnetic antenna structure.

FIGS. 10A and 10B show two examples of using different magnetic segments to form a spatial varying property in a magnetic antenna structure along the elongated direction of the antenna 110 in FIG. 1 in the x direction. The conducting ground plane 120 in FIG. 2A can be present in FIGS. 10A and 10B in some implementations. In the In FIG. 10A, different magnetic materials are arranged along the length of the bar-shaped magnetic antenna structure in the x direction. For example, a material with a wider bandwidth capability that supports smaller wavelengths can be in the center around the feed loop while a lower bandwidth material can form the outer extent of the bar-shaped magnetic antenna structure and perform at frequencies with longer wavelengths.

Gaps between different magnetic segments may also be used a parameter to care a desired spatially varying property. The gap dimension can either be zero or finite, depending upon optimization. In FIG. 10A, the gaps can be varied to further adjust the spatially varying property formed by the different material segments. In FIG. 10B, different magnetic segments in a magnetic antenna structure 110 are arranged along the x direction and are formed of the same magnetic material or structure but their relative gaps along with their lengths and cross sectional dimensions can be used to produce a desired spatial varying property.

Figure 10C:
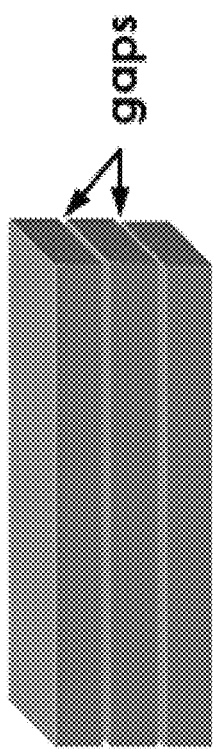
Figure 10D:
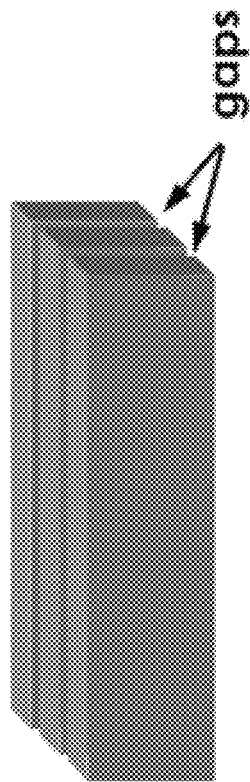

In addition, FIGS. 10C and 10D show two examples for the antenna 110 in FIG. 1 where a stack of magnetic material segments are used to form the antenna 110 that is elongated along the x direction and contain gaps between different segments in two other orthogonal directions different from the x direction. FIG. 10C shows magnetic slab segments elongated in the x direction are spaced from one another along the z direction to have gaps therebetween. FIG. 10D shows magnetic slab segments elongated in the x direction are spaced from one another along the y direction to have gaps therebetween. In various implementations, the segment arrangements in FIGS. 10A, 10B, 10C and 10D can be used to introduce gaps in the x-, y-, z-directions (length, width, thickness) or those configurations can be combined as needed.

Figure 11A:
FIGS. 11A-11C show examples of using two different magnetic materials in different segments, their shapes and dimensions to form a spatial varying property in a magnetic antenna structure.
Figure 11B:
Figure 11C:
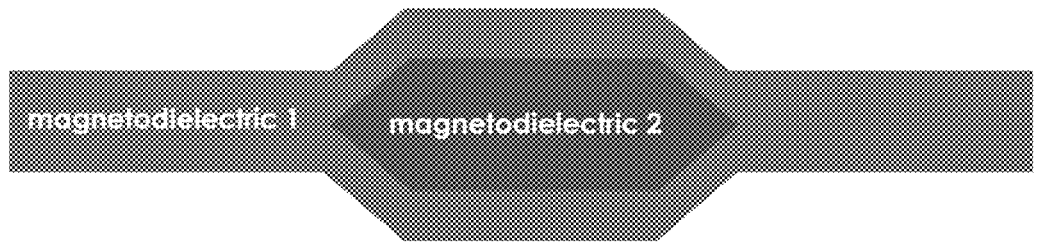

FIGS. 11A, 11B and 11C show examples of using two different magnetic materials in different segments, their shapes and dimensions to form a spatial varying property in a magnetic antenna structure. The different materials can be based on different material properties, e.g., the material composition, the material saturation magnetization, the material permeability, the material permittivity, or the material mass density. In FIG. 11A, for example, a magnetodielectric section with a higher $M_s$ can be added to one side (e.g., the top) of a magnetodielectric section with a lower $M_s$ in order to boost the cross-sectional and effective $M_s$ in the overlapping section. FIG. 11B shows an example in which different magnetodielectric materials can be interleaved and the baseline material can be removed from a section in order to result in a section with a smaller cross-sectional area and a lower effective $M_s$ when the center section has a lower $M_s$. In FIG. 11C, a section of a higher $M_s$ magnetodielectric material (#2) can be embedded in a lower $M_s$ magnetodielectric material (#1) by layering the lower $M_s$ material around the higher $M_s$ material.

Figure 12:
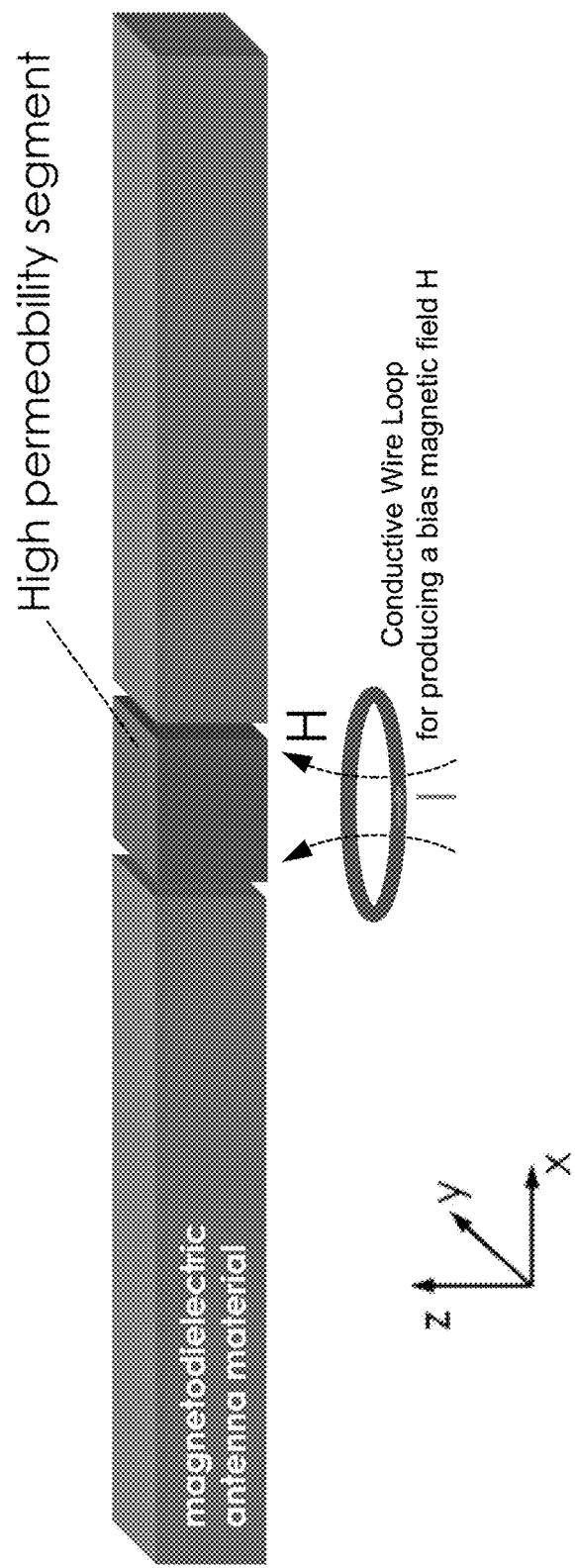
FIG. 12 shows an example of achieving a spatial varying property profile in a magnetic antenna structure that has a center high permeability segment.

FIG. 12 shows an example of achieving a spatial varying property profile in a magnetic antenna structure that has a center high permeability segment. In addition, FIG. 12 shows a higher permeability section can also be achieved by adding a magnetic field to bias the magnetization in the high permeability segment. As an example, a current-carrying coil can be placed near the center segment to produce a bias magnetic field. This design can soften the magnetization so that it is highly responsive to RF magnetic fields coupled into the magnetic antenna.

FIG. 13 shows an example of designing a spatial varying property profile in a magnetic antenna structure to enhance the antenna transmission efficiency. In this example, a material with a higher $M_s$ is added to the lower $M_s$ material section that forms the bulk of the magnetic antenna structure at a location where a conductive wire loop is coupled to the bar-shaped magnetic antenna structure for emitting an RF or microwave signal. FIGS. 13A and 13C show two pieces of higher $M_s$ material are added to two opposite sides of the bar at the loop. FIG. 13B shows a cross section of the antenna outside the region of the loop. By enhancing the cross-sectional area and/or the effective saturation magnetization in the local region around the loop used to drive the antenna, more flux can be driven into the bulk of the antenna for a given excitation current in the loop. Alternatively, a smaller current is needed to generate a sufficient transmission signal.

Figure 14:
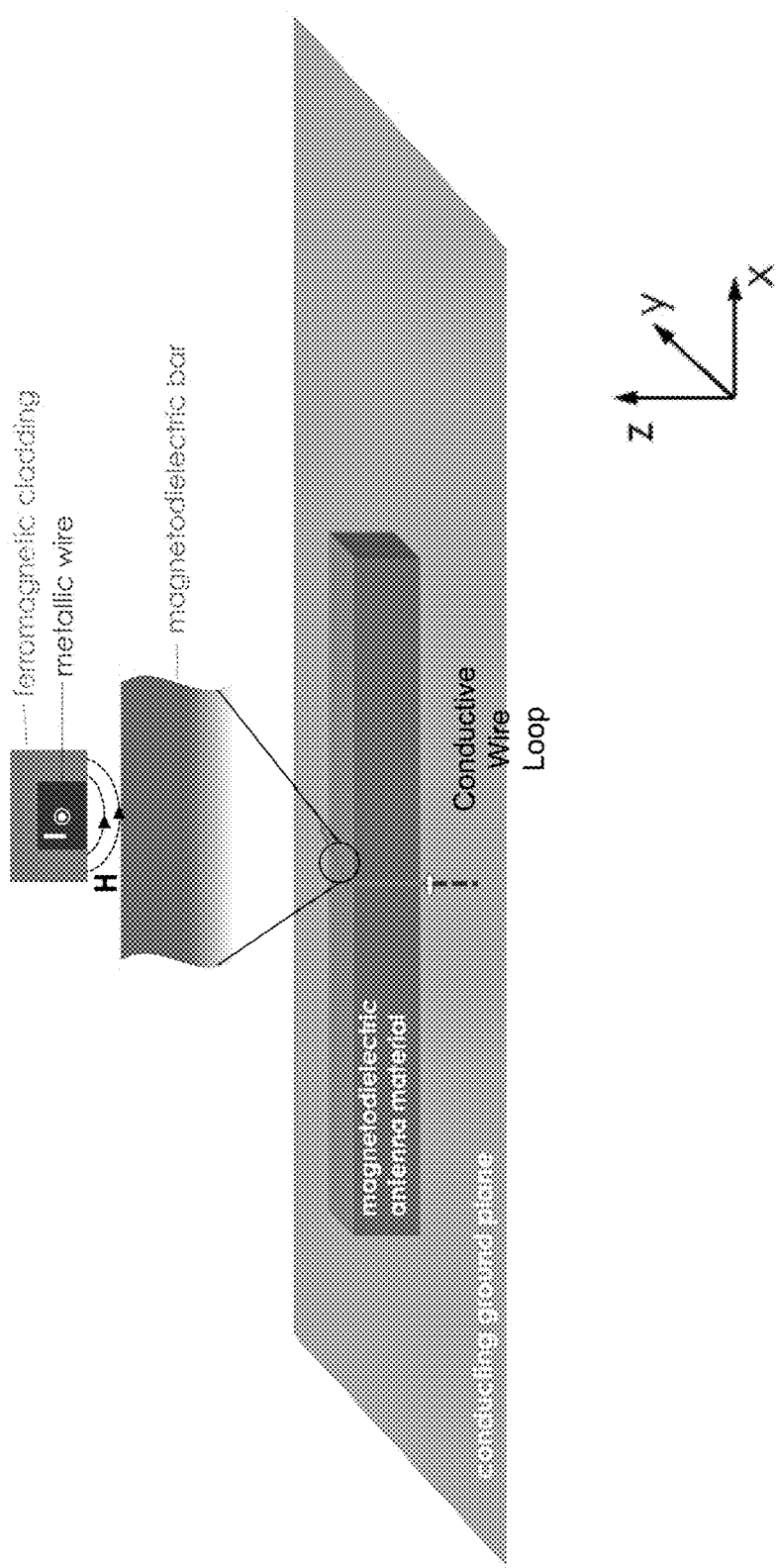
FIG. 14 illustrates an example to enhance transmission efficiency by providing a magnetic cladding over an antenna driving wire loop with a soft ferromagnetic material that is magnetically well-aligned and has minimal magnetic dispersion and loss.

FIG. 14 illustrates an example to enhance transmission efficiency by providing a magnetic cladding over an antenna driving wire loop with a soft ferromagnetic material that is magnetically well-aligned and has minimal magnetic dispersion and loss. The ferromagnetic cladding wraps around the upper part of the metallic wire, and the wire is exposed on the surface closest to the antenna. The cladding has its magnetization preferentially aligned along the axis of the wire so that it is highly permeable to the electrical currents sent down the wire. The cladding focuses the magnetic field from the wire onto the magnetic antenna. Field enhancement of almost a factor of two is possible versus a wire with no cladding. Hence, a smaller current is needed to drive the antenna during transmission when using such cladding in comparison with the same design without the cladding.

Figure 15:
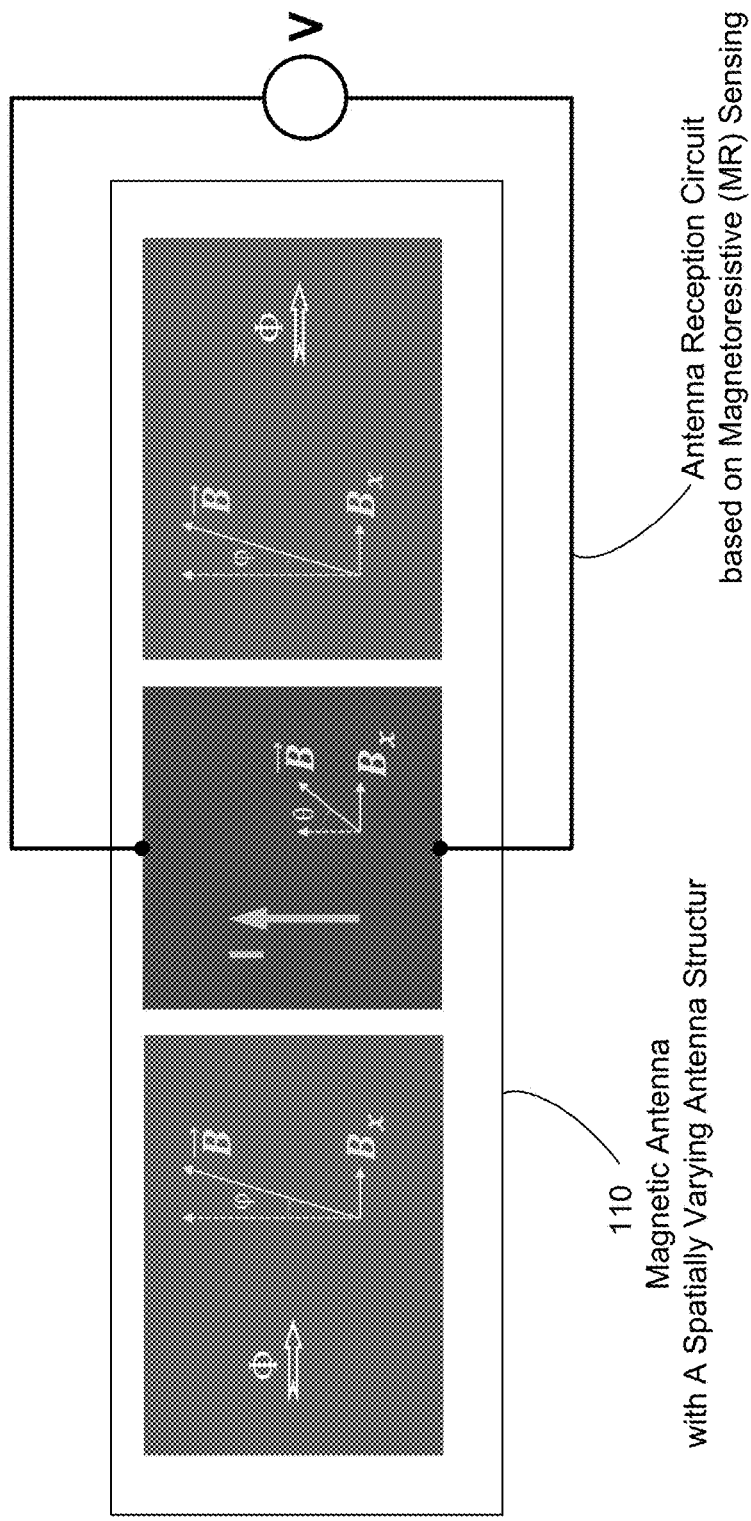
FIG. 15 shows an example of a spatial varying property profile in a magnetic antenna structure for a MR-sensing based antenna reception circuit.

FIG. 15 shows an example of a spatial varying property profile in a magnetic antenna structure for a MR-sensing based antenna reception circuit. This example illustrates that segments with lower $M_s$ can be used to improve the detection efficiency when using techniques that are sensitive to the change in magnetization, such as a magnetoresistive effect. Magnetoresistance is typically characterized by a change in the direction of a magnetization. A typical parameterization of such a change by the deflection angle, θ. By inducing a larger rotation of $\vec{B}$ in the detection region (θ>φ) in the center segment a shown in FIG. 15, a larger change in magnetoresistance is achieved. This increases the signal amplitude and the sensitivity to the antenna response.

The disclosed technology based on using a spatial varying property profile in a magnetic antenna structure to achieve one or more benefits can be combined with other magnetic performance enhancing techniques. For example, different from many antennas formed of metals, the magnetic materials can be exposed to a control magnetic field such as a DC magnetic field and the interaction between the control magnetic field and the magnetic material can cause a physical change in the material, e.g., the permeability in the magnetic antenna structure, and this physical change can lead to a change in one or more antenna properties associated with the permeability. This tuning or biasing capability can be combined with the spatially varying antenna profile in magnetic antenna devices.

Figure 16:
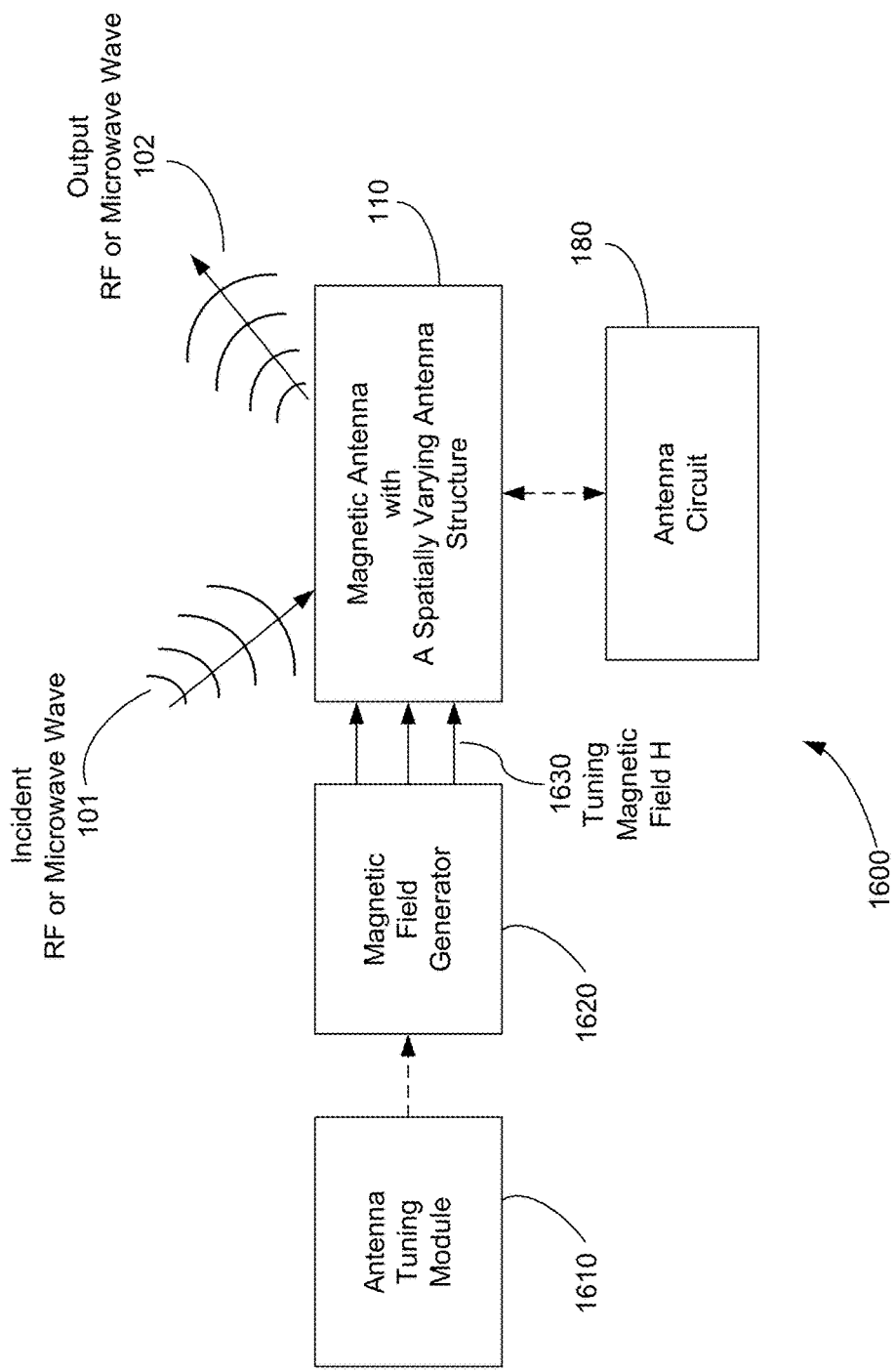
FIG. 16 shows an example for combining a tuning feature to the device in FIG. 1.

FIG. 16 illustrates an example of a magnetic antenna device 1600 that combines H-tuning with a spatially varying antenna structure. This device 1600 includes an antenna tuning module 1610 and a magnetic field generator 1620 to the device in FIG. 1. The magnetic antenna 110 that is ferromagnetic and interacts with an incident radio frequency or microwave signal to concentrate a magnetic field of the incident radio frequency or microwave signal locally in or near the magnetic antenna 110. The magnetic antenna 110 exhibits a material magnetization (M). In various implementations, the magnetic antenna 110 can be configured to exhibit a desired magnetic anisotropy so that the magnetization has a preferred direction (also known as the easy axis) due to the material property such as the material composition structure or the material shape. In other implementations, the magnetization may also be isotropic. The magnetic bias generator 1620 is provided to generate a control or tuning magnetic field 1630 (e.g., a DC magnetic field) at the magnetic antenna 110 and the presence of this magnetic field 1630(H) affects the material and can be used to cause a change in one or more physical properties (e.g., the permeability) in the magnetic antenna 110. The tuning magnetic field 1630 can be used to change an antenna property associated with the permeability. The antenna tuning module 1610 is communicatively coupled to the magnetic bias generator 1620 to adjust the DC magnetic field in tuning the permeability and the associated antenna property of the magnetic antenna 110.

The permeability and other material properties can change with the applied DC magnetic field. This and other changes can lead to corresponding changes in one or more associated antenna properties of the magnetic antenna 110. Some examples of antenna parameters are the antenna gain, antenna bandwidth, antenna impedance, antenna voltage standing wave ratio (VSWR) or standing wave ratio (SWR). Tuning those and other antenna parameters provides valuable post-manufacture tuning in operating such an antenna to improve the antenna performance based on specific operating conditions. For example, the antenna impedance is an important antenna parameter for the desired impedance matching condition and can adversely impact the antenna efficiency if not properly selected. The tunable device in FIG. 16 allows the impedance to be tuned or adjusted by controlling the magnetic field H to control the permeability value. For another example, the permeability value is also associated with the antenna frequency bandwidth and the resonant frequency so that the tuning can adjust the antenna frequency bandwidth and the resonant frequency during the antenna operation.

Figure 17:
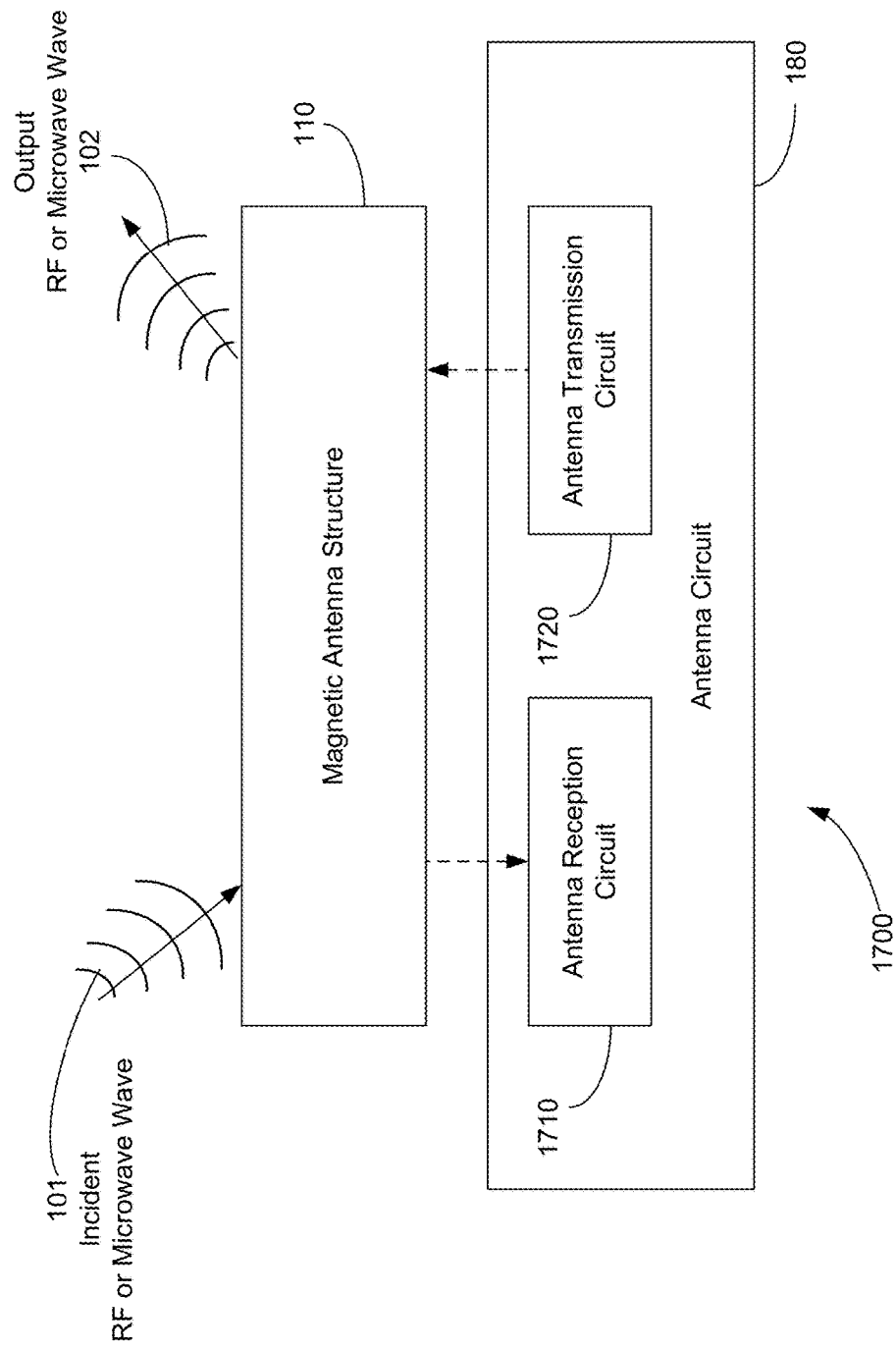
FIG. 17 shows an example of a magnetic antenna device that uses separate antenna reception and transmission circuits to allow individual optimization of reception and transmission operations.

As discussed in connection with the example in FIG. 4, the transmit and receive componentry of a magnetic antenna device can be decoupled so that each can be individually optimized for its specific role. FIG. 17 shows such an example 1700 where a designated antenna reception circuit 1710 is coupled to the magnetic antenna structure 110 to perform the reception operations, e.g., converting the localized magnetic field caused by the received radio frequency or microwave signal 101 into a local signal which is further processed to extract information carried by the received radio frequency or microwave signal 101. Separate from the antenna reception circuit 1710, a designated antenna transmission circuit 1710 is coupled to the magnetic antenna structure 110 to perform transmission operations, e.g., producing a local antenna signal carrying information to be transmitted and cause the local antenna signal to be carried in the output radio frequency or microwave signal 102 radiated by the magnetic antenna structure 110 (e.g., one or more conductive wire loops as part of the antenna transmission circuit 1720 where the varying currents in the loops generate oscillating magnetic fields in the magnetic antenna structure 110 to cause radiation of the output electromagnetic signal 102).

This designated reception circuit 1710 can be implemented in various configurations. For example, one or more conductive wire loops can be configured and optimized for receiving the incoming RF or microwave signal 101. The following sections provide two examples of magnetic antenna devices that use designated antenna reception circuits based on magnetoresistive (MR), magneto-optic (MO) or electro-optical (EO) effects.

Figure 18:
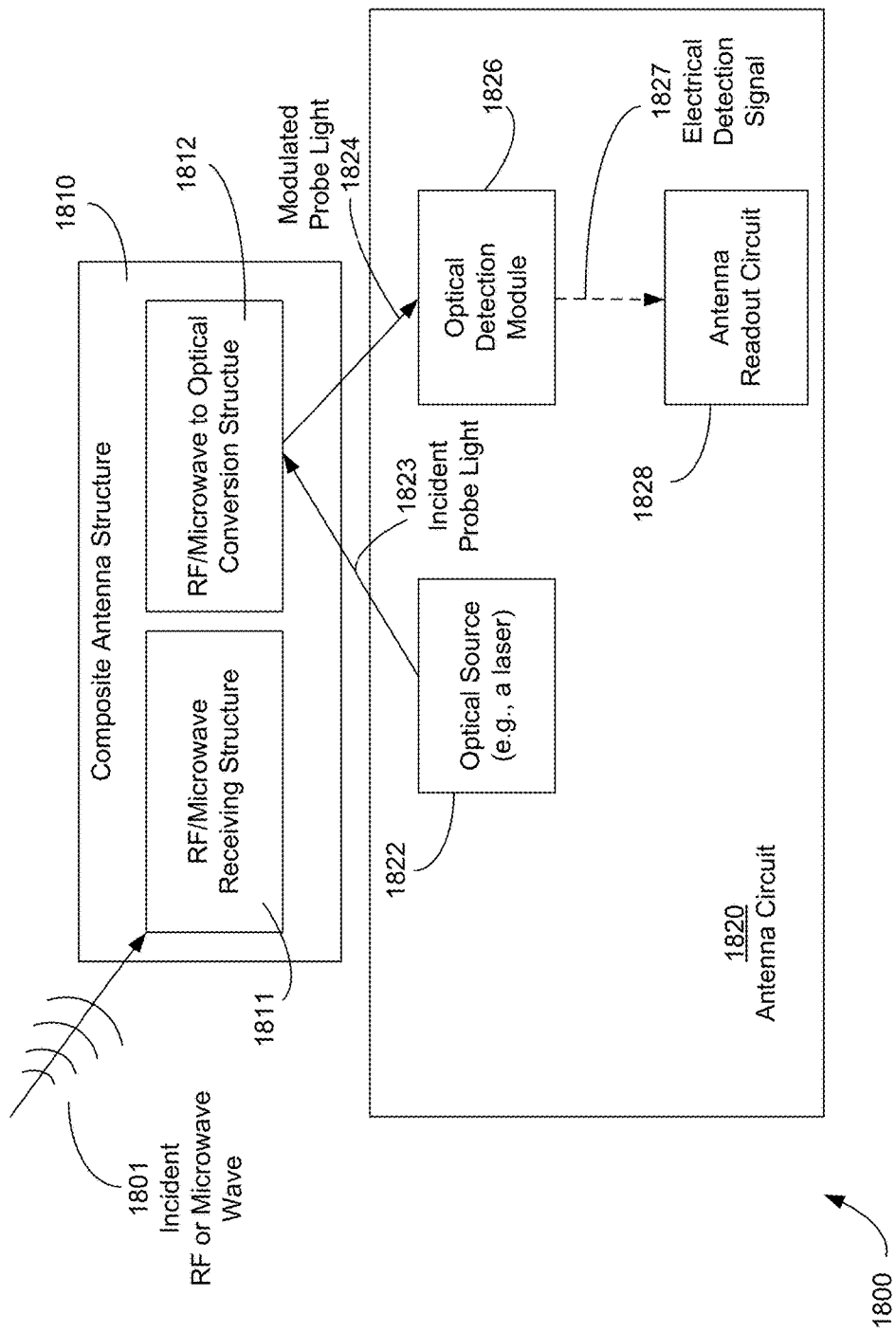
FIG. 18 shows an example of a magnetic antenna device that includes an antenna reception circuit using optical sensing as part of the antenna readout circuit.

FIG. 18 shows an example of an antenna device with a designated antenna reception circuit that implements a 3-step signal conversion to generate a local signal for antenna receiver operation. First, the incoming electromagnetic signal is captured as a local signal, both being in the same frequency domain of either the radio frequency (RF) or microwave frequency range. Second, the local signal is converted from the RF or microwave (MW) frequency range into an optical signal in the optical frequency range, e.g., an optical polarization signal. This RF/MW to optical conversion can be implemented based on an optical effect selected from various suitable optical effects in such an antenna device. Specifically, materials exhibiting a magneto-optical effect may be included in the antenna devices and are disclosed as examples to convert the RF/MW signal into the desired optical signal. Other optical materials, such as those exhibiting electro-optical effects, may also be used to achieve this RF/MW to optical conversion. Third, the optical signal is directed into an optical detector (e.g., a fast photodiode) within the antenna device that converts the optical signal back into an electrical RF or MW signal for further processing in the antenna device.

The disclosed 3-step signal conversion from the RF/MW frequency range to the optical frequency range and back to the RF/MW frequency range provides a unique antenna signal processing platform that enables certain signal processing operations to be performed in the optical domain and by using optical signal processing devices and techniques to achieve one or more technical or operational advantages or benefits. For example, certain signal processing limitations in the RF or MW frequency range may be mitigated or avoided when performing such processing by using optical devices in the optical domain. For another example, certain optical processing may be used in such antenna devices that would not otherwise be possible with other antenna devices that only rely on circuitry and processing in the RF or MW frequency range. In this regard, the disclosed antenna devices reflect a departure from various antenna designs that solely rely on circuitry and processing in one frequency domain (usually in the RF or MW frequency domain) and that perform the antenna operations based on transducing the power from a received electromagnetic wave into a guided wave on a transmission line. The disclosed antenna devices provide a "hybrid" antenna device platform with a local signal concentrator in combination with an optical or photonic inner core to benefit from both the RF/WM domain and the optical domain.

In FIG. 18, the antenna device 1800 includes a composite antenna structure 1810 and an associated antenna circuit 1820 containing an optical or photonic inner module. The composite antenna structure 1810 includes a first structure 1811 (RF/Microwave Receiving Structure) that electromagnetically couples with an incoming radio frequency or microwave signal 1801 to produce a local electromagnetic signal (e.g., in form of an oscillating magnetic field signal or an oscillating electric field signal) for the first of the three conversions, and a second structure 1812 (RF/Microwave to Optical Conversion Structure) that is coupled to the first structure 1811 to be within the local electromagnetic field caused by the received radio frequency or microwave signal to produce modulated optical signal that carries the information of the incoming electromagnetic signal 1801. The first structure 1811 for receiving the RF/microwave signal is designed to function as a magnetic flux concentrator that increases the strength of the magnetic flux of the received RF/microwave signal locally to facilitate the efficient RF/microwave to optical conversion in the second structure 1812. In various applications, the first structure 1811 can be implemented by magnetic materials for the magnetic antenna 110 in FIG. 1A. The second structure 1812 may, for example, include a material or device that exhibits a magneto-optical effect and converts the magnetic field of the local electromagnetic signal produced by the first structure 1811 into the modulated optical signal in some implementations, e.g., modulated optical polarization. In some other implementations, for example, this second structure 1812 may include a material or device that exhibits an electro-optical effect and converts the electric field of the local electromagnetic signal into the modulated optical signal in some other implementations.

The antenna circuit 1820 can include antenna transmit circuitry that performs functions for transmitting an outgoing antenna signal and antenna receiver circuitry that performs functions in connection with receiving the incoming electromagnetic signal 1801. FIG. 18 illustrates a part of the antenna receiver circuitry that involves the optical processing part of the operation of the antenna device 1800. Specifically, the antenna receiver circuitry includes a light source 1822 that emits probe light 1823 that is directed to the second structure 1812 of the composite antenna structure 1810 so that the second structure 1812 interacts with the probe light 1823 to produce modulated probe light 1824 due to the optical conversion operation such as a magneto-optical (MO) effect or electro-optic (EO) effect and the presence of the received radio frequency or microwave signal. The modulated probe light 1824 produced by the second structure 1812 carries the information in the received incoming radio frequency or microwave signal 1801. An optical detection module 1826 is provided and located to receive the modulated probe light 1824 and to convert the modulated probe light 1824 into a detection signal 1827 that carries the information in the received radio frequency or microwave signal 1801. This is the third part of the three conversions discussed above. As shown, the antenna circuit 1820 can include an antenna readout circuit 1828 coupled to receive the detection signal 1827 from the optical detection module 1826 and is operable to process the detection signal 1827 to extract the information in the received radio frequency or microwave signal 1801.

Figure 19:
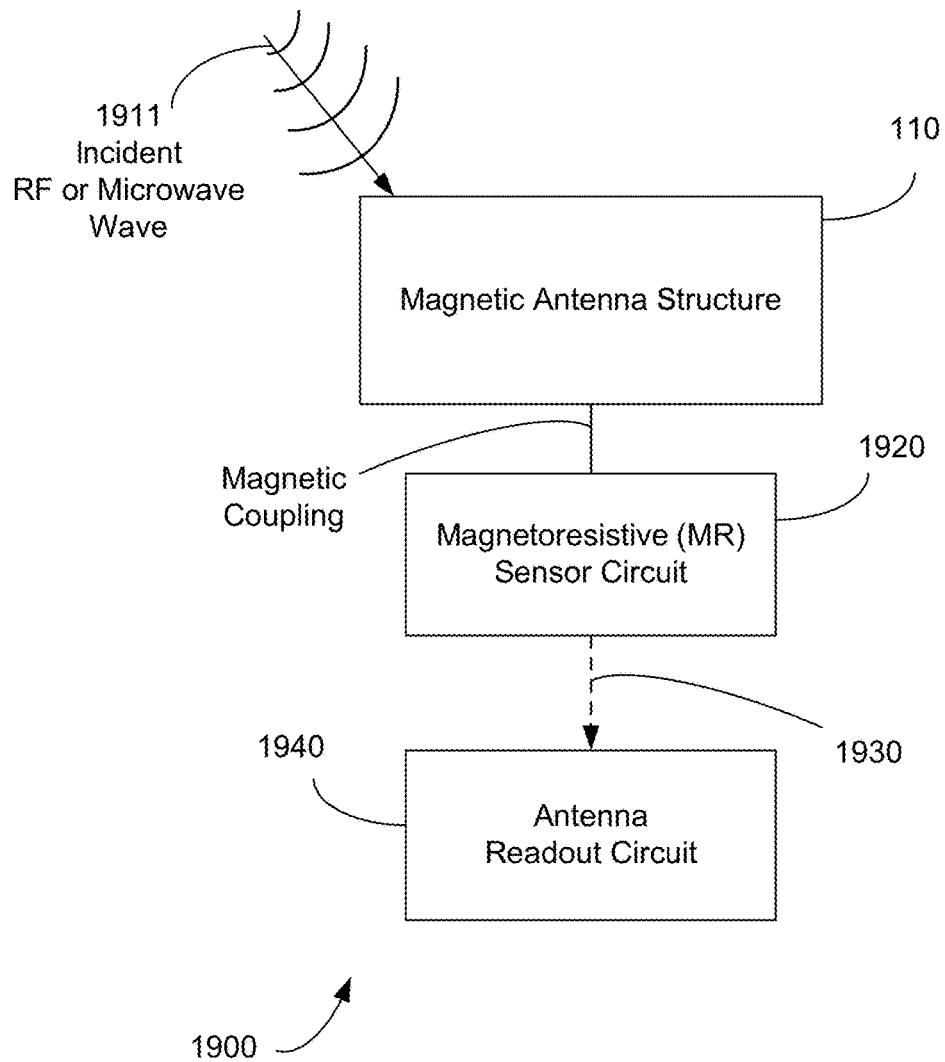
FIG. 19 shows an example of a magnetic antenna device that includes an antenna reception circuit using a magnetoresistive (MR) sensor circuit as part of the antenna readout circuit.

FIG. 19 shows an example of an antenna device with a designated antenna reception circuit that implements a magnetoresistive (MR) effect in which the electrical resistance of a material changes with an applied magnetic field to the material. A MR sensor circuit can be constructed by using a MR material and a circuit coupled to measure the variation of the resistance of the MR material under the magnetic field.

In FIG. 19, a composite antenna structure 1900 that couples with a received radio frequency or microwave signal 1911 to receive at least a portion of the radio frequency or microwave signal 1911; and an antenna receiver circuit that is communicatively coupled with the magnetic antenna structure 110 which may be implemented in various ways as disclosed above including using composite structures. The antenna receiver circuit includes an MR sensor circuit 1920 located relative to the composite antenna structure 110 to be within an electromagnetic field caused by the received radio frequency or microwave signal. The MR sensor circuit 1920 exhibits an MR effect and an associated variable resistance to sense a magnetic field of the electromagnetic field caused by the received radio frequency or microwave signal to produce an MR sensor signal 1930 that carries the information in the incident or received radio frequency or microwave signal 1911. The antenna receiver circuit is operable to process the MR sensor signal 1930 to extract the information. An antenna readout circuit 1940 can be used to perform the processing of the MR sensor signal 1930. The composite antenna structure 110 in FIG. 19 is shown as a receiving antenna and can also be used to radiate or emit an output RF or microwave signal.

In some of the examples of the magnetic antenna devices disclosed herein, e.g., those in FIGS. 2A, 2B, 3 and 4, a conformal magnetic antenna configuration can be used so that a ferromagnetic material antenna structure is placed over an electrically conductive surface as such a metal ground plane. A magnetic antenna device for implementing the disclosed technology may also be implemented in other configurations where a ferromagnetic material antenna structure can be magnetically excited. For example, a ferromagnetic material antenna structure can be shaped as a ferromagnetic antenna loop that is configured to enclose an electrically conductive object, a dielectric object or a lossy dielectric object. An antenna circuit is coupled to this combination of the ferromagnetic antenna loop and the object surrounded by the loop for antenna transmission or receiver operations. The ferromagnetic antenna loop is structured to operate with the conductive, the dielectric or the lossy dielectric object to radiate the electromagnetic energy from the antenna circuit or to receive the electromagnetic energy and to direct the received electromagnetic energy to the antenna circuit. In some embodiments, such a magnetic antenna device can include an electrically conductive loop engaged to the inner side of the ferromagnetic antenna loop to provide an electrically conductive interface between the conductive or the dielectric or the lossy dielectric object and the ferromagnetic antenna loop. More specifically, in a magnetically excited structural antenna in the above loop design, an MR sensor can be used for sensing the incident RF or MW signal.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Thus, particular embodiments have been described. Variations and enhancements of the described embodiments and other embodiments can be made based on what is described and illustrated.

What is claimed is:

1. A magnetic antenna device, comprising:
a magnetic antenna structure that is ferromagnetic and interacts with a radio frequency or microwave signal to receive and concentrate a magnetic field of the radio frequency or microwave signal locally in or near the magnetic antenna structure, the magnetic antenna structure configured to have a spatially varying property that varies spatially from one location to another location in at least a portion of the magnetic antenna structure; and
an antenna circuit communicatively coupled to the magnetic antenna structure to receive an antenna signal from the magnetic antenna structure associated with the received and concentrated magnetic field of the radio frequency or microwave signal locally in or near the magnetic antenna structure and to supply an output antenna signal to the magnetic antenna structure for transmission.

2. The antenna device as in claim 1, wherein:
the spatial varying property includes a spatially varying geometry.

3. The antenna device as in claim 2, wherein:
the spatial varying property includes, in addition to the spatially varying geometry, a spatially uniform material property.

4. The antenna device as in claim 3, wherein:
the spatially uniform material property includes a spatially uniform material composition.

5. The antenna device as in claim 3, wherein:
the spatially uniform material property includes a spatially uniform material saturation magnetization.

6. The antenna device as in claim 3, wherein:
the spatially uniform material property includes a spatially uniform material permeability.

7. The antenna device as in claim 3, wherein:
the spatially uniform material property includes a spatially uniform material permittivity.

8. The antenna device as in claim 3, wherein:
the spatially uniform material property includes a spatially uniform material mass density.

9. The antenna device as in claim 1, wherein:
the spatial varying property includes a spatially varying material property.

10. The antenna device as in claim 9, wherein:
the spatially varying material property includes a spatially varying material composition.

11. The antenna device as in claim 9, wherein:
the spatially varying material property includes a spatially varying material saturation magnetization.

12. The antenna device as in claim 9, wherein:
the spatially varying material property includes a spatially varying material permeability.

13. The antenna device as in claim 9, wherein:
the spatially varying material property includes a spatially varying material permittivity.

14. The antenna device as in claim 9, wherein:
the spatially varying material property includes a spatially varying material mass density.

15. The antenna device as in claim 1, wherein:
the magnetic antenna structure having the spatially varying material property includes different antenna segments wherein materials for the different antenna segments have different costs.

16. The antenna device as in claim 1, wherein:
the magnetic antenna structure having the spatially varying material property includes different antenna segments that are configured to operate with different frequency bandwidths.

17. The antenna device as in claim 1, wherein:
the spatial varying property includes a spatially varying profile in a spatial geometry, or a spatial material property.

18. The antenna device as in claim 17, wherein:
the spatial varying property includes both a spatially varying geometry and a spatially varying material property.

19. The antenna device as in claim 1, wherein:
the magnetic antenna structure includes an elongated portion that further includes different segments with different spatial cross section profiles within the elongated portion.

20. The antenna device as in claim 19, wherein:
in the elongated portion that includes different segments with different spatial cross section profiles, there is a tapered segment that spatially changes an electromagnetic flux along the elongated portion.

21. The antenna device as in claim 19, wherein:
the elongated portion that includes different segments is structured to include different material saturation magnetizations along the elongated portion.

22. The antenna device as in claim 21, wherein:
the elongated portion that includes different segments is structured to include a segment having a higher material saturation magnetization than material saturation magnetizations of two adjacent segments along the elongated portion.

23. The antenna device as in claim 19, wherein:
the elongated portion that includes different segments is structured to have a spatially varying material saturation magnetization, and the elongated portion has magnetic anisotropy with a preferred axis of magnetization that is perpendicular to the elongated portion.

24. The antenna device as in claim 1, wherein:
the magnetic antenna structure includes an elongated portion that includes a spatially uniform material, and the antenna device further includes a magnetic material segment that is attached to the elongated portion and has a saturation magnetization higher than a saturation magnetization of the elongated portion s.

25. The antenna device as in claim 1, comprising:
an electrically conductive structure including a surface as a conducting ground plane for the antenna device, wherein the magnetic antenna structure is positioned over the conducting ground plane; and
wherein the antenna circuit includes one or more conductive loops, each conductive loop including a loop segment to enclose a part of the magnetic antenna structure with respect to the conducting ground plane so that the part of the magnetic antenna structure is between the conducting ground plane and the conductive loop segment.

26. The antenna device as in claim 25, comprising:
a ferromagnetic material cladding around a conductive loop.

27. The antenna device as in claim 1, comprising:
an antenna receiver circuit as part of the antenna circuit, the antenna receiver circuit including a magnetoresistive (MR) sensor circuit located relative to the magnetic antenna structure to be either magnetically coupled to the magnetic antenna structure or within an electromagnetic field caused by a received radio frequency or microwave signal, wherein the MR sensor circuit exhibits an MR effect and an associated variable resistance to sense a magnetic field of the electromagnetic field caused by the received radio frequency or microwave signal to produce an MR sensor signal that carries information in the received radio frequency or microwave signal.

28. The antenna device as in claim 27, wherein:
the magnetic antenna structure includes one or more magnetic segments adjacent to the MR sensor circuit to have a larger rotation of the magnetization or higher value of the concentrated magnetic field to enhance the MR effect in the MR sensor circuit.

29. The antenna device as in claim 1, wherein:
the magnetic antenna structure includes a loop that exhibits a high permeability, and an electrically conductive object surrounded by the loop.

30. The antenna device as in claim 1, wherein:
the magnetic antenna structure includes a loop that exhibits a high permeability, and a dielectric object surrounded by the loop.

31. The antenna device as in claim 1, wherein:
the magnetic antenna structure includes a loop that exhibits a high permeability, and a lossy dielectric object surrounded by the loop.

32. The antenna device as in claim 1, comprising:
a magnetic sensing structure coupled to the magnetic antenna structure to be within the electromagnetic field caused by the received radio frequency or microwave signal, wherein the magnetic sensing structure exhibits an optical effect that varies with the electromagnetic field to cause optical modulation;
a light source that emits probe light that is directed to the magnetic sensing structure so that the magnetic sensing structure interacts with the probe light to produce modulated probe light due to the optical effect and the presence of the received radio frequency or microwave signal, the modulated probe light carrying information in the received radio frequency or microwave signal; and
an optical detection module located to receive the modulated probe light and to convert the modulated probe light into a detection signal that carries the information in the received radio frequency or microwave signal.

33. The antenna device as in claim 32, wherein:
the magnetic sensing structure exhibits a magneto-optical or electro-optic effect.

34. The antenna device as in claim 1, comprising:
a magnetic bias generator that generates a DC magnetic field at the magnetic antenna structure to cause a change in a permeability in the magnetic antenna structure which in turn changes an antenna property associated with the permeability; and
a tuning control module communicatively coupled to the magnetic bias generator to adjust the DC magnetic field in tuning the permeability and the associated antenna property of the magnetic antenna structure.

35. A method for operating a magnetic antenna device, comprising:
providing a magnetic antenna structure in the magnetic antenna device, that is ferromagnetic and has a spatially varying property that varies spatially from one location to another location in at least a portion of the magnetic antenna structure, to gain an advantage from the spatially varying property of the magnetic antenna structure in operating the magnetic antenna device;

operating the magnetic antenna device to radiate or receive a radio frequency or microwave signal via the magnetic antenna structure; and in receiving a radio frequency or microwave signal, operating the magnetic antenna structure to concentrate a magnetic field of the received radio frequency or microwave signal locally in or near the magnetic antenna structure, and using the locally concentrated magnetic field to extract information from the received radio frequency or microwave signal.

36. The method as in claim 35, comprising:
placing the magnetic antenna structure over an electrically conductive structure that includes a surface as a conducting ground plane for the magnetic antenna device in transmitting or receiving the radio frequency or microwave signal.

37. The method as in claim 35, wherein:
the spatial varying property includes a spatially varying geometry or shape.

38. The method as in claim 37, wherein:
the spatially varying property includes, in addition to the spatially varying geometry or shape, a spatially uniform material property.

39. The method as in claim 35, wherein:
the spatial varying property includes a spatially varying material property in one or more materials contained in the magnetic antenna structure, and
the spatially varying material property is independent of a geometry or shape of the magnetic antenna structure.

40. The method as in claim 39, wherein:
the spatially varying material property includes a spatially varying material composition.

41. The method as in claim 39, wherein:
the spatially varying material property includes a spatially varying material saturation magnetization.

42. The method as in claim 39, wherein:
the spatially varying material property includes a spatially varying material permeability.

43. The method as in claim 39, wherein:
the spatially varying material property includes a spatially varying material permittivity.

44. The method as in claim 39, wherein:
the spatially varying material property includes a spatially varying material mass density.

45. The method as in claim 35, wherein:
the magnetic antenna structure having the spatially varying material property includes different antenna segments wherein materials for the different antenna segments have different costs.

46. The method as in claim 35, wherein:
the magnetic antenna structure having the spatially varying material property includes different antenna segments that are configured to operate with different frequency bandwidths.

47. The method as in claim 35, wherein:
the spatial varying property includes a combination of (1) a spatially varying geometry or shape and (2) a spatially varying material property that is independent of a geometry or shape of the magnetic antenna structure.

48. The method as in claim 35, comprising:
coupling an MR sensor circuit to the magnetic antenna structure to be within an electromagnetic field caused by a received radio frequency or microwave signal or to be magnetically coupled to the magnetic antenna structure;

operating the MR sensor circuit to sense a magnetic field of the electromagnetic field caused by the received radio frequency or microwave signal or the magnetization of the magnetic antenna structure that is modulated by the received radio frequency or microwave signal to produce an MR sensor signal that carries the information in the received radio frequency or microwave signal; and processing the MR sensor signal to extract the information in the received radio frequency or microwave signal.

49. The method as in claim 48, wherein:
the magnetic antenna structure includes one or more magnetic segments adjacent to the MR sensor circuit to have a larger rotation of magnetization or higher value of a concentrated magnetic field produced by the one or more magnetic segments to enhance the MR effect in the MR sensor circuit.

50. The method as in claim 35, wherein:
the magnetic antenna structure includes a loop that exhibits a high permeability, and an electrically conductive object surrounded by the loop.

51. The method as in claim 35, wherein:
the magnetic antenna structure includes a loop that exhibits a high permeability, and a dielectric object surrounded by the loop.

52. The method as in claim 35, wherein:
the magnetic antenna structure includes a loop that exhibits a high permeability, and a lossy dielectric object surrounded by the loop.

53. The method as in claim 35, comprising:
using the received radio frequency or microwave signal by the magnetic antenna to cause optical modulation of probe light to produce modulated probe light carrying information in the received radio frequency or microwave signal; and
operating an optical detection module and to convert the modulated probe light into a detection signal that carries the information in the received radio frequency or microwave signal.

54. The method as in claim 35, comprising:
using different magnetic antenna material compositions at different costs in different antenna segments of the magnetic antenna structure as part of the spatially varying material property to reduce the overall cost of the magnetic antenna structure.

55. The method as in claim 35, comprising:
using the spatially varying material property to reduce a weight of the magnetic antenna structure.

56. The method as in claim 35, comprising:
using the spatially varying material property to reduce a size of the magnetic antenna structure.

57. The method as in claim 35, comprising:
applying a DC magnetic field at the magnetic antenna structure to cause a change in a permeability in the magnetic antenna structure so as to change an antenna property associated with the permeability; and
adjusting the applied DC magnetic field to tune the permeability and the associated antenna property of the magnetic antenna structure in order to adjust an operation of the antenna device.

58. The method as in claim 57, wherein the applied DC magnetic field is adjusted to change a gain of the antenna device.

59. The method as in claim 57, wherein the applied DC magnetic field is adjusted to change a frequency bandwidth of the antenna device.

60. The method as in claim 57, wherein the applied DC magnetic field is adjusted to change an impedance of the antenna device.

61. The method as in claim 57, wherein the applied DC magnetic field is adjusted to change an antenna voltage standing wave ratio (VSWR) or standing wave ratio (SWR) of the antenna device.

62. A magnetic antenna device, comprising:
- a magnetic antenna structure that is ferromagnetic and interacts with a radio frequency or microwave signal to receive and concentrate a magnetic field of the radio frequency or microwave signal locally in or near the magnetic antenna structure; and
- an antenna circuit including (1) an antenna reception circuit coupled to the magnetic antenna structure to interact with the received and concentrated magnetic field of the radio frequency or microwave signal locally in or near the magnetic antenna structure, and (2) an antenna transmission circuit separated from the antenna reception circuit and also coupled to the magnetic antenna structure to supply an output antenna signal to the magnetic antenna structure for transmission.

63. The antenna device as in claim 62, wherein:
the magnetic antenna structure is configured to have a spatially varying property that varies spatially from one location to another location in at least a portion of the magnetic antenna structure.

64. The antenna device as in claim 62, wherein:
the spatial varying property includes a spatially varying geometry or shape.

65. The antenna device as in claim 62, wherein:
the spatially varying property includes, in addition to the spatially varying geometry or shape, a spatially uniform material property.

66. The antenna device as in claim 62, wherein:
the spatial varying property includes a spatially varying material property in one or more materials contained in the magnetic antenna structure, and
the spatially varying material property is independent of a geometry or shape of the magnetic antenna structure.

67. The antenna device as in claim 62, wherein:
the antenna reception circuit includes a conductive wire loop that wraps around a part of the magnetic antenna structure to produce an induced current in response to the received and concentrated magnetic field of the radio frequency or microwave signal.

68. The antenna device as in claim 62, wherein:
the antenna reception circuit includes a magnetoresistive (MR) sensor to produce a sensor signal in response to the received and concentrated magnetic field of the radio frequency or microwave signal.

69. The antenna device as in claim 62, wherein:
the antenna reception circuit includes:
- a sensing structure coupled to the magnetic antenna structure to interact with the received radio frequency or microwave signal, wherein the sensing structure exhibits an optical effect that varies with an electromagnetic field to cause optical modulation;
- a light source that emits probe light that is directed to the sensing structure so that the sensing structure interacts with the probe light to produce modulated probe light due to the optical effect and the presence of the received radio frequency or microwave signal, the modulated probe light carrying information in the received radio frequency or microwave signal; and
- an optical detection module located to receive the modulated probe light and to convert the modulated probe light into a detection signal that carries the information in the received radio frequency or microwave signal.

70. The antenna device as in claim 62, wherein:
the antenna transmission circuit includes a conductive wire loop that wraps around a part of the magnetic antenna structure to receive a driving current which produces an oscillating magnetic field in the magnetic antenna structure to cause radiation of an output radio frequency or microwave signal.

71. The antenna device as in claim 62, comprising:
- a magnetic bias generator that generates a DC magnetic field at the magnetic antenna structure to cause a change in a permeability in the magnetic antenna structure which in turn changes an antenna property associated with the permeability; and
- a tuning control module communicatively coupled to the magnetic bias generator to adjust the DC magnetic field in tuning the permeability and the associated antenna property of the magnetic antenna structure.

* * * * *